(12) United States Patent
Thangarasa et al.

(10) Patent No.: US 11,564,179 B2
(45) Date of Patent: Jan. 24, 2023

(54) SYSTEMS AND METHODS OF DETERMINING A REPORTING CONFIGURATION ASSOCIATED WITH A COVERAGE LEVEL OF A WIRELESS DEVICE

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/312,262

(22) PCT Filed: Jun. 21, 2017

(86) PCT No.: PCT/EP2017/065192
§ 371 (c)(1),
(2) Date: Dec. 20, 2018

(87) PCT Pub. No.: WO2017/220635
PCT Pub. Date: Dec. 28, 2017

(65) Prior Publication Data
US 2019/0239170 A1    Aug. 1, 2019

Related U.S. Application Data
(60) Provisional application No. 62/353,017, filed on Jun. 21, 2016.

(51) Int. Cl.
*H04W 52/00* (2009.01)
*H04W 52/36* (2009.01)
(Continued)

(52) U.S. Cl.
CPC .............. *H04W 52/365* (2013.01); *H04L 1/08* (2013.01); *H04W 16/18* (2013.01); *H04W 24/10* (2013.01); *H04W 4/70* (2018.02); *H04W 74/0833* (2013.01)

(58) Field of Classification Search
CPC ............. H04W 52/365; H04W 52/367; H04W 72/0413; H04W 72/042; H04W 52/242;
(Continued)

(56) References Cited

U.S. PATENT DOCUMENTS 9,055,544 B2    6/2015    Worrall et al.
9,131,404 B2    9/2015    Siomina et al.
(Continued)

FOREIGN PATENT DOCUMENTS

| CN | 103125133 A | 5/2013 |
|---|---|---|
| CN | 103339994 A | 10/2013 |

(Continued)

OTHER PUBLICATIONS

Ericsson, "Power headroom reporting requirements", Change request, 3GPP TSG-RAN WG4 Meeting #79AH, Hong Kong, China, Jun. 28, 2016, pp. 1-3, R4-79AH-0153.

(Continued)

*Primary Examiner* — Tu X Nguyen
(74) *Attorney, Agent, or Firm* — Coats & Bennett, PLLC

(57) ABSTRACT

Systems and methods of determining a reporting configuration associated with a coverage level of a wireless device are provided. In one exemplary embodiment, a method performed by a wireless device (105, 200, 300, 400, 1000) in a wireless communication system (100) includes obtaining (503) information indicating a coverage level (113a-d) of the wireless device. Further, the method includes determining (507), from amongst different reporting configurations (115a-d) respectively associated with different cover- (Continued)

age levels of the wireless device, the reporting configuration associated with the coverage level indicated by the obtained information. Also, the method includes reporting (511) a measurement result using the determined reporting configuration.

20 Claims, 11 Drawing Sheets

(51) Int. Cl.
*H04W 24/10* (2009.01)
*H04L 1/08* (2006.01)
*H04W 16/18* (2009.01)
*H04W 74/08* (2009.01)
*H04W 4/70* (2018.01)

(58) Field of Classification Search
CPC ............ H04W 74/0833; H04W 76/14; H04W 52/265; H04W 74/08
See application file for complete search history.

(56) References Cited

U.S. PATENT DOCUMENTS

| | | | |
|---|---|---|---|
| 9,848,350 B2 | 12/2017 | Yang et al. | |
| 9,900,075 B2 | 2/2018 | Yang et al. | |
| 2012/0071106 A1 | 3/2012 | Kadous et al. | |
| 2012/0250562 A1 | 10/2012 | Li et al. | |
| 2014/0098761 A1* | 4/2014 | Lee ................... | H04W 74/006 370/329 |
| 2017/0013570 A1* | 1/2017 | Vajapeyam ......... | H04W 52/365 |
| 2017/0195464 A1* | 7/2017 | Lee ..................... | H04L 69/324 |

FOREIGN PATENT DOCUMENTS

| | | |
|---|---|---|
| CN | 103404192 A | 11/2013 |
| CN | 104811995 A | 7/2015 |
| EP | 2636259 A2 | 9/2013 |
| EP | 2903195 A1 | 8/2015 |
| EP | 2919534 A1 | 9/2015 |
| EP | 2636259 B1 | 1/2017 |
| EP | 3320726 A1 | 5/2018 |
| EP | 3320726 B1 | 6/2019 |
| WO | 2014190472 A1 | 12/2014 |
| WO | 2015116870 A1 | 8/2015 |
| WO | 2015136866 A1 | 9/2015 |

OTHER PUBLICATIONS

Ericsson, "Power headroom reporting requirements", 3GPP TSG-RAN WG4 Meeting #79AH, Hong Kong, China, Jun. 28, 2016, pp. 1-3, R4-79AH-0152.

Ericsson et al., "PHR reporting for NB-IOT low-power class UEs", Change Request, 3GPP TSG-RAN4 Meeting #82bis, Spokane, US, Apr. 3, 2017, pp. 1-4, R4-1706190.

Huawei, et al., "CR for PHR requirement for NB-IoT R13", Change Request, 3GPP TSG-RAN WG4 Meeting #83, Hangzhou, China, May 15, 2017, pp. 1-3, R4-1706040.

Nokia Networks, "Connected mobility for Rel13 UEs in EC mode", 3GPP TSG RAN WG2 Meeting #91 bi, Malmö, Sweden, Oct. 5, 2015, pp. 1-3, R2-154556.

ZTE, "Remaining Issues on UL Power Control for NB-IoT", 3GPP TSG RAN WG1 Meeting #84bis, Busan, Korea, Apr. 11, 2016, pp. 1-7, R1-162765, 3GPP.

Qualcomm Incorporated, "CR on NB-IoT Power Headroom Reporting", 3GPP TSG-WG4 Meeting #79, Nanjing, China, May 23, 2016, pp. 1-2, R4-164412, 3GPP.

Nokia Siemens Networks, Nokia Corporation, Remaining issues on uplink power control, 3GPP TSG RAN WG1 #62 Meeting, Madrid, Spain, Aug. 23-27, 2010, R1-104438.

* cited by examiner

SYSTEMS AND METHODS OF DETERMINING A REPORTING CONFIGURATION ASSOCIATED WITH A COVERAGE LEVEL OF A WIRELESS DEVICE

FIELD OF DISCLOSURE

The present disclosure relates generally to the field of communications, and in particular to determining a reporting configuration associated with a coverage level of a wireless device.

BACKGROUND

Machine-to-machine (M2M) communication, which is also referred to as machine-type communication (MTC), is used for establishing communication between machines as well as between machines and human-operated devices. This communication may include the exchange of data, signaling information, measurement data, configuration information, or the like. Further, the device size may vary from that of a wallet to that of a typical base station. M2M devices are quite often used for applications like sensing environmental conditions (e.g., temperature reading), metering or measurement (e.g., electricity usage), fault finding or error detection, or the like. In these applications, the M2M devices typically operate in a low-power, sleep mode and are very seldom active. When they are active, it is typically for a brief instance during a much longer periodic time duration depending upon the type of service (e.g., 200 milliseconds every 2 seconds, 500 milliseconds every 60 minutes). The M2M device may also perform measurement on other frequencies or other radio access technologies (RATs).

Furthermore, MTC devices are expected to be of lower cost/complexity. A lower cost/complexity user equipment (UE) envisaged for M2M operation may have smaller downlink or uplink maximum transport block size (e.g., 1000 bits), and reduced downlink channel bandwidth (e.g., 1.4 MHz for a data channel such as a physical shared data channel (PDSCH). A lower cost UE may also support half-duplex, frequency division duplex (HD-FDD) operation and may have features such as a single receiver at the UE, smaller downlink or uplink maximum transport block size (e.g. 1000 bits) and reduced downlink channel bandwidth of 1.4 MHz for data channel. The low cost UE may also be termed as low complexity UE.

The path loss between an M2M device and a base station may be very large in some scenarios such as an M2M device used as a sensor or metering device located in a remote location such as in the basement of a building. In these scenarios, the reception of a signal transmitted by a base station is very challenging due to path loss (e.g., the path loss may be 20 dB worse than for normal operation). In order to address these challenges, the reception of these signals on the uplink or downlink should be enhanced by using advanced techniques at the UE or radio network node (e.g., base station). These advanced techniques may include boosting transmit power, repeating signal transmission, adding redundancy to the transmit signal, or enhanced receiver techniques. In general, when employing any of these coverage enhancing techniques, the M2M device is considered to be operating in a coverage enhancing mode. A lower complexity UE (e.g., a UE having a single receiver) may also be capable of supporting enhanced coverage mode of operation.

Radio measurements done by the UE are typically performed on a serving cell as well as on a neighbor cell (e.g., narrowband (NB) cell, NB physical resource block (PRB)) over some known reference symbols or pilot sequences (e.g., narrowband cell-specific reference signal (NB-CRS), narrowband secondary synchronization signal (NB-SSS), narrowband primary synchronization signal (NB-PSS)). Further, the radio measurements are done on cells having an intra-frequency carrier and an inter-frequency carrier as well as on inter-RAT carriers depending on whether the UE supports that RAT. To enable inter-frequency and inter-RAT measurements, the network has to configure the frequency gaps to allow the UE to perform the radio measurement.

The measurements are done for various purposes such as mobility, positioning, self-organizing network (SON), minimization of drive tests (MDT), operation and maintenance (O&M), and network planning and optimization. In Long Term Evolution (LTE), these measurements include cell identification (i.e., physical cell identifier (PCI) acquisition), reference symbol received power (RSRP), reference symbol received quality (RSRQ), cell global identifier (CGI) acquisition, reference signal time difference (RSTD), UE RX-TX time difference measurement, and radio link monitoring (RLM) (e.g., out-of-sync/in-sync detection). Channel state information (CSI) measurements performed by the UE are used by the network such as for scheduling and link adaptation. CSI reports that are derived from the CSI measurements include a channel quality indicator (CQI), a precoding matrix index (PMI), and a rank indicator (RI). Further, these measurements may be performed on reference signals such as a cell-specific reference signal (CRS), a channel state information reference signal (CSI-RS), or a demodulation reference signal (DMRS).

In order to identify an unknown cell (e.g., a new neighbor cell), the UE has to acquire the timing of that cell and eventually the physical cell identifier (PCI). For cell search and cell identification in legacy LTE, the #0 and #5 downlink subframes carry synchronization signals (e.g., the primary synchronization signal (PSS) and the secondary synchronization signal (SSS)). Similarly, the synchronization signals used for Narrowband Internet of Things (NB-IOT) are referred to as NB-PSS and NB-SSS. However, their periodicity may be different from the LTE legacy synchronization signals. After cell search and cell identification in LTE, the UE also measures RSRP or RSRQ of the newly identified cell and may report the measurement to the network node.

For the NB-IoT RAT, 504 PCIs are available. The measurements are performed in all radio resource control (RRC) states (i.e., RRC idle and connected states). In the RRC connected state, the measurements are used by the UE for one or more tasks such as for reporting the results to the network node. In the RRC idle state, the measurements are used by the UE for one or more tasks such as for cell selection or cell reselection.

The objective of the NB-IOT industry standard is to specify a radio access for cellular IOT based, to a great extent, on a non-backward-compatible variant of Evolved Universal Terrestrial Radio Access (E-UTRA), which addresses improved indoor coverage, support for a massive number of low throughput devices, low delay sensitivity, ultra-low device cost, low device power consumption and an optimized network architecture. The NB-IOT carrier bandwidth (i.e., Bw2) is 200 kHz. For LTE, the operating bandwidths (i.e., Bw1) are 1.4 MHz, 3 MHz, 5 MHz, 10 MHz, 15 MHz, 20 MHz, etc. In addition, NB-IoT supports three different deployment scenarios. First, stand-alone operation utilizes, for example, the spectrum currently being used by the Global System for Mobile communications (GSM) and the Enhanced Data Rates for GSM Evolution (EDGE) RAN systems, which is collectively referred to as GERAN, as a replacement of one or more GSM carriers. In principle, it operates on any carrier frequency that is neither within the carrier of another system nor within the guard band of another system's operating carrier. The other system may be another NB-IOT operation or any other RAT (e.g., LTE). Second, guard band (i.e., guard bandwidth) operation utilizes the unused resource blocks within an LTE carrier's guard-band. As an example, for an LTE bandwidth of 20 MHz (i.e., Bw1=20 MHz or 100 resource blocks (RBs)), the guard band operation of NB-IOT may be anywhere outside the central 18 MHz LTE bandwidth but within the 20 MHz LTE bandwidth. Third, in-band operation (i.e., in-bandwidth operation) utilizes RBs within a normal LTE carrier. More generally, the operation of one RAT within the bandwidth of another RAT is also referred to as in-band operation. For instance, for an LTE bandwidth of 50 RBs (i.e., Bw1=10 MHz or 50 RBs), NB-IOT operation over one RB within the 50 RBs is referred to as in-band operation.

In NB-IOT for all three scenarios, the downlink transmission is based on orthogonal frequency division multiplexing (OFDM) with 15 kHz subcarrier spacing and the same symbol and cyclic prefix (CP) durations as for legacy LTE. For uplink transmission, both multi-tone transmissions based on single carrier frequency division multiple access (SC-FDMA) and single-tone transmission with either 3.75 kHz or 15 kHz subcarrier spacing are supported. This means that the physical waveforms for NB-IoT in the downlink and partly in the uplink are similar to the corresponding waveforms in legacy LTE.

In the downlink, NB-IOT supports both master information broadcast and system information broadcast, which are carried by different physical channels. For in-band operation, it is possible for an NB-IoT UE to decode a narrowband physical broadcast channel (NPBCH) without knowing the legacy PRB index. Further, NB-IoT supports both a narrowband physical downlink control channel (NPDCCH) and a narrowband physical downlink shared channel (NPDSCH). In addition, the operation mode of NB-IOT must be indicated to the UE, and currently Third Generation Partnership Project (3GPP) consider this indication by means of narrowband secondary synchronization signal (NSSS), narrowband master information block (NB-MIB), or perhaps other downlink signals.

Narrowband reference signals (NRSs) are separate from the legacy LTE CRS but the design principles are similar. For instance, NRSs do not overlap with legacy CRS or PDCCH, may be turned off in subframes when NPDSCH/NPSCCH is not transmitted, and the subcarriers used are derived from PCI. Further, downlink synchronization signals consist of a primary synchronization signal (NPSS) transmitted in subframe number five in every radio frame, and a secondary synchronization signal (NSSS) transmitted in subframe number nine.

Furthermore, NB-IoT supports multi-PRB operation as described in 3GPP Release-13. In this scenario, NPSS, NSSS, PBCH, and system information are only broadcast on one or more anchor PRBs and upon connection setup, UEs may be assigned to carry out their connected sessions on other secondary PRBs that do not contain these signals. Therefore, UEs will monitor paging and perform random access and RRC connection setup on the anchor PRB, transmit user plane data on the secondary PRB, and once released to RRC idle mode, they will return to the anchor PRB unless directed otherwise. As such, UE measurements based on the previously mentioned physical channels cannot be performed on the secondary PRB. However, the anchor PRB and the secondary PRB may belong to different deployment scenarios. For instance, the anchor PRB may be in the guard band whereas the secondary PRB is in-band, in which case there are only NRS reference symbols available on the anchor-PRB whereas both NRS and legacy CRS are available on the secondary-PRB.

Further, some PRBs may be power boosted for the in-band deployment scenario and typically the anchor-PRB would be power boosted to ensure good reception of NPSS, NSSS, PBCH, and NPDCCH. An anchor PRB may also be referred to as a primary PRB, basic positioning reference signal (PRS), common signal PRS, main PRS, or the like. A secondary PRB may also be referred to as a companion PRS, booster PRS, data PRS, or the like. A PRB may also be referred to as a cell, NB cell, NB resource, resource block (RB), virtual RB (VRB), physical resource, or the like.

The low complexity and low cost UEs have different characteristics compared to legacy UEs. These characteristics result in some limitations. One such limitation is that these UEs have limited reporting capabilities compared to legacy UEs. For instance, the NB-IOT UE has only two bits (e.g., 4 values) that may be used for reporting the power headroom, compared to six bits (e.g., 64 values) for legacy LTE UEs. As such, the reported value may not reflect the actual power usage conditions in the NB-IoT UE (i.e., less accurate information is provided to the serving network node). Since the reported measurements are used by the network for operational tasks (e.g., scheduling, mobility, positioning), less accurate or less optimal scheduling decisions may be made by the network. Accordingly, there is a need for improved techniques for reporting a coverage level of a wireless device. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later. Systems and methods of determining a reporting configuration associated with a coverage level of a wireless device in a wireless communication system is described herein. According to one aspect, a method performed by a wireless device (e.g., UE) in a wireless communication system comprises obtaining information indicating a coverage level of the wireless device. Further, the method includes determining, from amongst different reporting configurations respectively associated with different coverage levels of the wireless device, the reporting configuration associated with the coverage level indicated by the obtained information. Also, the method includes reporting a measurement result using the determined reporting configuration.

According to another aspect, the step of reporting the measurement results may include generating an indication of the measurement result using the determined reporting configuration. Further, the method may include transmitting, to a network node in the wireless communication system, the indication of the measurement result.

According to another aspect, the method may include transmitting, to a network node in the wireless communication system, an indication of the coverage level of the wireless device.

According to another aspect, the step of obtaining the information may include determining the coverage level of the wireless device based on the information.

According to another aspect, the method may include receiving, from a network node in the wireless communication system, the information indicating the coverage level of the wireless device.

According to another aspect, the step of obtaining may include determining a measurement of a signal transmitted or received by the wireless device, wherein the information includes the signal measurement.

According to another aspect, the step of obtaining the information may include determining a number of repetitions used for random access transmissions by the wireless device based on a random access configuration of the wireless device, wherein the information includes the number of repetitions used for the random access transmissions.

According to another aspect, the step of determining the reporting configuration may include receiving, from a network node in the wireless communication system, an indication of the different reporting configurations.

According to another aspect, the different reporting configurations may report the measurement result with different reporting resolutions.

According to another aspect, the different reporting configurations may report the measurement result with different reporting ranges.

According to another aspect, the different reporting configurations may report the measurement result with different reporting ranges with each range having at least one of a different minimum reporting value and a different maximum reporting value.

According to another aspect, the information may include an indication that a network node serving the wireless device is using or supports the coverage level.

According to another aspect, the information may include an indication that a network node serving the wireless device supports the different coverage levels.

According to another aspect, the information may include a measurement of a signal transmitted or received by the wireless device.

According to another aspect, the signal measurement may include a measurement of a signal level or quality of the signal transmitted or received by the wireless device.

According to another aspect, the information may include a random access configuration associated with the wireless device performing random access transmissions to a network node.

According to another aspect, the information may include a capability of the wireless device to support the different coverage levels.

According to another aspect, the information may include data provided by a network node to assist the wireless device in said obtaining.

According to another aspect, the information may include an indication of the different coverage levels of the wireless device.

According to another aspect, the information may include statistics associated with the different coverage levels.

According to another aspect, the information may include a log of the different coverage levels used by the wireless device.

According to another aspect, the step of determining the reporting configuration may be based on one or more predefined rules.

According to another aspect, the step of determining the reporting configuration may be based on predefined time periods associated with a measurement of a signal received by the wireless device from a network node.

According to another aspect, the step of determining the reporting configuration may be based on one or more predefined conditions.

According to another aspect, the step of determining the reporting configuration may be based on one or more resources associated with the different reporting configurations being available for use by the wireless device.

According to another aspect, the step of determining the reporting configuration may be based on data provided by a network node to assist the wireless device in determining the reporting configuration.

According to another aspect, the step of determining the reporting configuration may be based on statistics associated with the different reporting configurations.

According to another aspect, the step of determining the reporting configuration may be based on a log of the different reporting configurations used by the wireless device.

According to another aspect, the different coverage levels may include one or more normal coverage levels and one or more enhanced coverage levels (e.g., enhanced coverage level 0, 1, 2, etc.).

According to another aspect, the wireless device may be capable of operating as a Long Term Evolution (LTE) Category Narrowband 1 (LTE Cat NB1) device and the determined reporting configuration may include a power headroom report mapping for the LTE Cat NB1 device.

According to another aspect, the power headroom report mapping for the LTE Cat NB1 device operating in normal coverage may be defined as follows:

| Reported value | Measured quantity value (dB) |
| --- | --- |
| POWER_HEADROOM_0 | $-23 \leq PH < 4$ |
| POWER_HEADROOM_1 | $4 \leq PH < 16$ |
| POWER_HEADROOM_2 | $16 \leq PH < 28$ |
| POWER_HEADROOM_3 | $PH \geq 28$ |

According to another aspect, the power headroom report mapping for the LTE Cat NB1 device operating in enhanced coverage may be defined as follows:

| Reported value | Measured quantity value (dB) |
| --- | --- |
| POWER_HEADROOM_0 | $-23 \leq PH < -11$ |
| POWER_HEADROOM_1 | $-11 \leq PH < 1$ |
| POWER_HEADROOM_2 | $1 \leq PH < 13$ |
| POWER_HEADROOM_3 | $PH \geq 13$ |

According to one aspect, a wireless device in a wireless communication system comprises an obtainer circuit configured to obtain information indicating a coverage level of the wireless device. Further, the wireless device includes a determining circuit configured to determine, from amongst different reporting configurations respectively associated with different coverage levels of the wireless device, the reporting configuration associated with the coverage level indicated by the obtained information. In addition, the wireless device includes a reporter circuit configured to report a measurement result using the determined reporting configuration.

According to another aspect, the reporter circuit may be configured to generate an indication of the measurement result using the determined reporting configuration. Further, the wireless device may include a transmitter circuit configured to transmit, to a network node (e.g., eNB) in the wireless communication system, the indication of the measurement result.

According to another aspect, the wireless device may include a transmitter configured to transmit, to a network node in the wireless communication system, an indication of the coverage level of the wireless device.

According to another aspect, the obtainer circuit may be configured to determine the coverage level of the wireless device based on the information.

According to another aspect, the wireless device may include a receiver configured to receive, from a network node in the wireless communication system, the information indicating the coverage level of the wireless device.

According to another aspect, the obtainer circuit may be configured to determine a measurement of a signal transmitted or received by the wireless device. Further, the information may include the signal measurement.

According to another aspect, the obtainer circuit may be configured to determine a number of repetitions used for random access transmissions by the wireless device based on a random access configuration of the wireless device. Also, the information may include the number of repetitions used for the random access transmissions.

According to another aspect, the determination circuit may be configured to receive, from a network node in the wireless communication system, an indication of the different reporting configurations.

According to another aspect, the determination circuit may be configured to determine the reporting configuration based on one or more predefined rules.

According to another aspect, the determination circuit may be configured to determine the reporting configuration based on predefined time periods associated with a measurement of a signal received by the wireless device from a network node.

According to another aspect, the determination circuit may be configured to determine the reporting configuration based on one or more predefined conditions.

According to another aspect, the determination circuit may be configured to determine the reporting configuration based on one or more resources associated with the different reporting configurations being available for use by the wireless device.

According to another aspect, the determination circuit may be configured to determine the reporting configuration based on data provided by a network node to assist the wireless device in determining the reporting configuration.

According to another aspect, the determination circuit may be configured to determine the reporting configuration based on statistics associated with the different reporting configurations.

According to another aspect, the determination circuit may be configured to determine the reporting configuration based on a log of the different reporting configurations used by the wireless device.

According to one aspect, a wireless device in a wireless communication system is configured to obtain information indicating a coverage level of the wireless device. Further, the wireless device is configured to determine, from amongst different reporting configurations respectively associated with different coverage levels of the wireless device, the reporting configuration associated with the coverage level indicated by the obtained information. In addition, the wireless device is configured to report a measurement result using the determined reporting configuration.

According to another aspect, the wireless device may be configured to generate an indication of the measurement result using the determined reporting configuration. Also, the wireless device may be configured to transmit, to a network node (e.g., eNB) in the wireless communication system, the indication of the measurement result.

According to another aspect, the wireless device may be configured to transmit, to a network node in the wireless communication system, an indication of the coverage level of the wireless device.

According to another aspect, the wireless device may be configured to determine the coverage level of the wireless device based on the information.

According to another aspect, the wireless device may be configured to receive, from a network node in the wireless communication system, the information indicating the coverage level of the wireless device.

According to another aspect, the wireless device may be configured to determine a measurement of a signal transmitted or received by the wireless device. Further, the information may include the signal measurement.

According to another aspect, the wireless device may be configured to determine a number of repetitions used for random access transmissions by the wireless device based on a random access configuration of the wireless device. Also, the information may include the number of repetitions used for the random access transmissions.

According to another aspect, the wireless device may be configured to receive, from a network node in the wireless communication system, an indication of the different reporting configurations.

According to another aspect, the wireless device may be configured to determine the reporting configuration based on one or more predefined rules.

According to another aspect, the wireless device may be configured to determine the reporting configuration based on predefined time periods associated with a measurement of a signal received by the wireless device from a network node.

According to another aspect, the wireless device may be configured to determine the reporting configuration based on one or more predefined conditions.

According to another aspect, the wireless device may be configured to determine the reporting configuration based on one or more resources associated with the different reporting configurations being available for use by the wireless device.

According to another aspect, the wireless device may be configured to determine the reporting configuration based on data provided by a network node to assist the wireless device in determining the reporting configuration.

According to another aspect, the wireless device may be configured to determine the reporting configuration based on statistics associated with the different reporting configurations.

According to another aspect, the wireless device may be configured to determine the reporting configuration based on a log of the different reporting configurations used by the wireless device.

According to one aspect, a wireless device in a wireless communication system comprises an obtaining module for obtaining information indicating a coverage level of the wireless device. Further, the wireless device includes a determining module for determining, from amongst different reporting configurations respectively associated with different coverage levels of the wireless device, the reporting configuration associated with the coverage level indicated by the obtained information. Also, the wireless device includes a reporting module for reporting a measurement result using the determined reporting configuration.

According to another aspect, the reporting module may include generating an indication of the measurement result using the determined reporting configuration. Further, the wireless device may include a transmitting module for transmitting, to a network node in the wireless communication system, the indication of the measurement result.

According to another aspect, the wireless device may include a transmitting module for transmitting, to a network node in the wireless communication system, an indication of the coverage level of the wireless device.

According to another aspect, the obtaining module may include determining the coverage level of the wireless device based on the information.

According to another aspect, the obtaining module may include receiving, from a network node in the wireless communication system, the information indicating the coverage level of the wireless device.

According to another aspect, the obtaining module may include determining a measurement of a signal transmitted or received by the wireless device. Further, the information may include the signal measurement.

According to another aspect, the obtaining module may include determining a number of repetitions used for random access transmissions by the wireless device based on a random access configuration of the wireless device. Also, the information may include the number of repetitions used for the random access transmissions.

According to another aspect, the determining module may include receiving, from a network node in the wireless communication system, an indication of the different reporting configurations.

According to another aspect, the determining module may include determining the reporting configuration based on one or more predefined rules.

According to another aspect, the determination circuit may include determining the reporting configuration based on predefined time periods associated with a measurement of a signal received by the wireless device from a network node.

According to another aspect, the determining module may include determining the reporting configuration based on one or more predefined conditions.

According to another aspect, the determining module may include determining the reporting configuration based on one or more resources associated with the different reporting configurations being available for use by the wireless device.

According to another aspect, the determining module may include determining the reporting configuration based on data provided by a network node to assist the wireless device in determining the reporting configuration.

According to another aspect, the determining module may include determining the reporting configuration based on statistics associated with the different reporting configurations.

According to another aspect, the determining module may include determining the reporting configuration based on a log of the different reporting configurations used by the wireless device.

According to one aspect, a wireless device in a wireless communication system comprises a processor and a memory. The memory contains instructions, executable by the processor, whereby the wireless device is configured to obtain information indicating a coverage level of the wireless device. Further, the memory contains instructions whereby the wireless device is configured to determine, from amongst different reporting configurations respectively associated with different coverage levels of the wireless device. Also, the reporting configuration is associated with the coverage level indicated by the obtained information. In addition, the memory contains instructions whereby the wireless device is configured to report a measurement result using the determined reporting configuration.

According to another aspect, the wireless device may be configured to generate an indication of the measurement result using the determined reporting configuration. Also, the wireless device may be configured to transmit, to a network node (e.g., eNB) in the wireless communication system, the indication of the measurement result.

According to another aspect, the wireless device may be configured to transmit, to a network node in the wireless communication system, an indication of the coverage level of the wireless device.

According to another aspect, the wireless device may be configured to determine the coverage level of the wireless device based on the information.

According to another aspect, the wireless device may be configured to receive, from a network node in the wireless communication system, the information indicating the coverage level of the wireless device.

According to another aspect, the wireless device may be configured to determine a measurement of a signal transmitted or received by the wireless device. Further, the information may include the signal measurement.

According to another aspect, the wireless device may be configured to determine a number of repetitions used for random access transmissions by the wireless device based on a random access configuration of the wireless device. Also, the information may include the number of repetitions used for the random access transmissions.

According to another aspect, the wireless device may be configured to receive, from a network node in the wireless communication system, an indication of the different reporting configurations.

According to another aspect, the wireless device may be configured to determine the reporting configuration based on one or more predefined rules.

According to another aspect, the wireless device may be configured to determine the reporting configuration based on predefined time periods associated with a measurement of a signal received by the wireless device from a network node.

According to another aspect, the wireless device may be configured to determine the reporting configuration based on one or more predefined conditions.

According to another aspect, the wireless device may be configured to determine the reporting configuration based on one or more resources associated with the different reporting configurations being available for use by the wireless device.

According to another aspect, the wireless device may be configured to determine the reporting configuration based on data provided by a network node to assist the wireless device in determining the reporting configuration.

According to another aspect, the wireless device may be configured to determine the reporting configuration based on statistics associated with the different reporting configurations.

According to another aspect, the wireless device may be configured to determine the reporting configuration based on a log of the different reporting configurations used by the wireless device.

According to one aspect, a computer program, comprising instructions which, when executed on at least one processor of a wireless device, cause the at least one processor to carry out any of the methods described herein. Further, a carrier may contain the computer program with the carrier being one of an electronic signal, optical signal, radio signal, or computer readable storage medium.

According to one aspect, a method performed by a network node in a wireless communication system comprises obtaining information indicating a coverage level of a wireless device in the wireless communication system. Further, the method includes determining, from amongst different reporting configurations respectively associated with different coverage levels of the wireless device, the reporting configuration associated with the coverage level indicated by the obtained information.

According to another aspect, the method may include transmitting, to the wireless device, the determined reporting configuration.

According to another aspect, the method may include receiving, from the wireless device, a measurement result using the determined reporting configuration.

According to another aspect, the method may include receiving, from the wireless device, an indication of one or more coverage levels supported by the wireless device. Further, the information may include the one or more coverage levels supported by the wireless device. In addition, the step of obtaining the information may include determining the coverage level from the one or more coverage levels supported by the wireless device.

According to another aspect, the step of determining the reporting configuration may be based on one or more measurement results reported by the wireless device.

According to another aspect, the one or more measurement results may be associated with a measurement of a signal transmitted or received by the wireless device.

According to another aspect, the different reporting configurations may report the measurement result with different reporting resolutions.

According to another aspect, the different reporting configurations may report the measurement result with different reporting ranges.

According to another aspect, the different reporting configurations may report the measurement result with different reporting ranges with each range having at least one of a different minimum reporting value and a different maximum reporting value.

According to another aspect, the method may include adapting one or more operational parameters of the wireless device based on the measurement result.

According to another aspect, the one or more operational parameters may include at least one of coding rate, modulation scheme, and resource assignment.

According to one aspect, a network node in a wireless communication system comprises an obtainer circuit configured to obtain information indicating a coverage level of a wireless device in the wireless communication system. Further, the network node includes a determination circuit configured to determine, from amongst different reporting configurations respectively associated with different coverage levels of the wireless device, the reporting configuration associated with the coverage level indicated by the obtained information.

According to another aspect, the network node may include a transmitter circuit configured to transmit, to the wireless device, the determined reporting configuration.

According to another aspect, the network node may include a receiver configured to receive, from the wireless device, a measurement result using the determined reporting configuration.

According to another aspect, the network node may include a receiver circuit configured to receive, from the wireless device, an indication of one or more coverage levels supported by the wireless device. Further, the information may include the one or more coverage levels supported by the wireless device. In addition, the obtainer circuit may be configured to determine the coverage level from the one or more coverage levels supported by the wireless device.

According to another aspect, the determination circuit may be further configured to determine the reporting configuration based on one or more measurement results reported by the wireless device.

According to another aspect, the network mode may include an adaptation circuit configured to adapt one or more operational parameters of the wireless device based on the measurement result.

According to one aspect, a network node in a wireless communication system is configured to obtain information indicating a coverage level of a wireless device in the wireless communication system. Further, the network node is configured to determine, from amongst different reporting configurations respectively associated with different coverage levels of the wireless device, the reporting configuration associated with the coverage level indicated by the obtained information.

According to another aspect, the network node may be configured to transmit, to the wireless device, the determined reporting configuration.

According to another aspect, the network node may be configured to receive, from the wireless device, a measurement result using the determined reporting configuration.

According to another aspect, the network node may be configured to receive, from the wireless device, an indication of one or more coverage levels supported by the wireless device. Further, the information may include the one or more coverage levels supported by the wireless device. In addition, network node may be configured to determine the coverage level from the one or more coverage levels supported by the wireless device.

According to another aspect, the network node may be further configured to determine the reporting configuration based on one or more measurement results reported by the wireless device.

According to another aspect, the network mode may be further configured to adapt one or more operational parameters of the wireless device based on the measurement result.

According to one aspect, a network node in a wireless communication system comprises an obtaining module for obtaining information indicating a coverage level of a wireless device in the wireless communication system. Further, the network node includes a determining module for determining, from amongst different reporting configurations respectively associated with different coverage levels of the wireless device, the reporting configuration associated with the coverage level indicated by the obtained information.

According to another aspect, the network node may include a transmitting module for transmitting, to the wireless device, the determined reporting configuration.

According to another aspect, the network node may include a receiving module for receiving, from the wireless device, a measurement result using the determined reporting configuration.

According to another aspect, the network node may include a receiving module for receiving, from the wireless device, an indication of one or more coverage levels supported by the wireless device. Further, the information may include the one or more coverage levels supported by the wireless device. Also, the obtaining module may include determining the coverage level from the one or more coverage levels supported by the wireless device.

According to another aspect, the determining module may include determining the reporting configuration based on one or more measurement results reported by the wireless device.

According to another aspect, the network mode may include an adapting module for adapting one or more operational parameters of the wireless device based on the measurement result.

According to one aspect, a network node in a wireless communication system comprises a processor and a memory. Further, the memory contains instructions, executable by the processor, whereby the network node is configured to obtain information indicating a coverage level of a wireless device in the wireless communication system. Further, the memory contains instructions whereby the network node is configured to determine, from amongst different reporting configurations respectively associated with different coverage levels of the wireless device, the reporting configuration associated with the coverage level indicated by the obtained information.

According to another aspect, the memory may contain instructions whereby the network node transmits, to the wireless device, the determined reporting configuration.

According to another aspect, the memory may contain instructions whereby the network node receives, from the wireless device, a measurement result using the determined reporting configuration.

According to another aspect, the memory may contain instructions whereby the network node receives, from the wireless device, an indication of one or more coverage levels supported by the wireless device. Further, the information may include the one or more coverage levels supported by the wireless device. Also, the memory may contain instructions whereby the network node determines the coverage level from the one or more coverage levels supported by the wireless device.

According to another aspect, the memory may contain instructions whereby the network node determines the reporting configuration based on one or more measurement results reported by the wireless device.

According to another aspect, the memory may contain instructions whereby the network node adapts one or more operational parameters of the wireless device based on the measurement result.

According to one aspect, a computer program, comprising instructions which, when executed on at least one processor of a network node, cause the at least one processor to carry out any of the methods described herein. Further, a carrier may contain the computer program with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
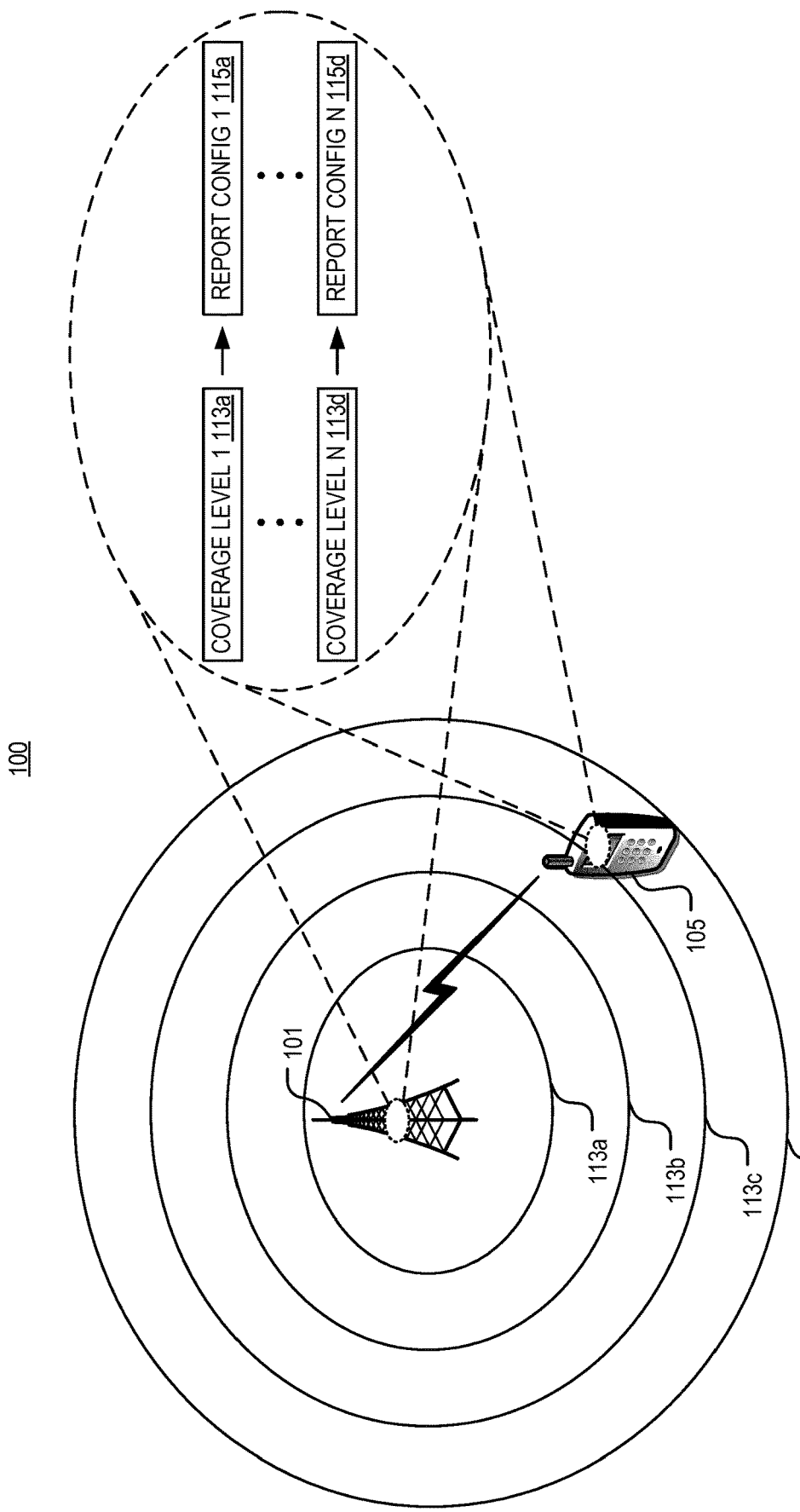
FIG. 1 illustrates one embodiment of a system for determining a reporting configuration associated with a coverage level of a wireless device in accordance with various aspects as described herein.

The systems and methods described herein include determining a reporting configuration associated with a coverage level of a wireless device (e.g., UE). A wireless device that is operating in enhanced coverage may be power limited compared to a wireless device operating in normal coverage. The reporting resolution may be limited in some cases for low cost or low complexity wireless devices, and the systems and methods described herein allow a wireless device to adapt the reporting resolution based on its coverage area. This provides more accurate information on the reporting to a network node (e.g., base station) that results in more accurate decisions (e.g., coding rate, modulation scheme, resource assignment) by the network node that correspond to the actual channel conditions. For example, FIG. 1 illustrates one embodiment of a system 100 for determining a reporting configuration associated with a coverage level 113a-d of a wireless device 105 in accordance with various aspects as described herein. In FIG. 1, a network node 101 (e.g., base station) obtains information (e.g., signal measurement) indicating a coverage level 113a-d (e.g., normal coverage, enhanced coverage) of the wireless device 105 (e.g. UE). This obtained information may include an indication that the network node 101 serving the wireless device 105 supports one or more of the coverage levels, a measurement of a signal transmitted or received by the wireless device 105, a random access configuration associated with the wireless device 105 performing random access transmissions to the network node 101, a capability of the wireless device 105 to support the different coverage levels, an indication of the different coverage levels of the wireless device 105, or the like.

In FIG. 1, the network node 101 determines, from amongst different reporting configurations 115a-b (e.g., power headroom report mapping) respectively associated with different coverage levels 113a-d of the wireless device 105, the reporting configuration 115a-b associated with the coverage level 113a-d indicated by the obtained information. The network node 101 then transmits, to the wireless device 105, the determined reporting configuration 115a-b. The wireless device 105 then receives this information and determines the reporting configuration 115a-b associated with the coverage level 113a-d indicated by the obtained information. In addition, the wireless device 105 performs a measurement of a signal transmitted or received by the wireless device 105. Further, the wireless device 105 reports an indication of the signal measurement using the determined reporting configuration 115a-b. The network node 101 then receives the indication of the signal measurement using the determined reporting configuration 115a-b and adapts one or more operational parameters (e.g., coding rate, modulation scheme, resource assignment).

Additionally or alternatively, the network node 101 may be configured to support a wireless communication system (e.g., NB-IoT, NR, LTE, LTE-NR, 5G, UMTS, GSM, or the like). Further, the network node 101 may be a base station (e.g., eNB), an access point, a wireless router, or the like. The network node 101 may serve wireless devices such as wireless device 105. The wireless device 105 may be configured to support a wireless communication system (e.g., NB-IoT, NR, LTE, LTE-NR, 5G, UMTS, GSM, or the like). The wireless device 105 may be a UE, a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
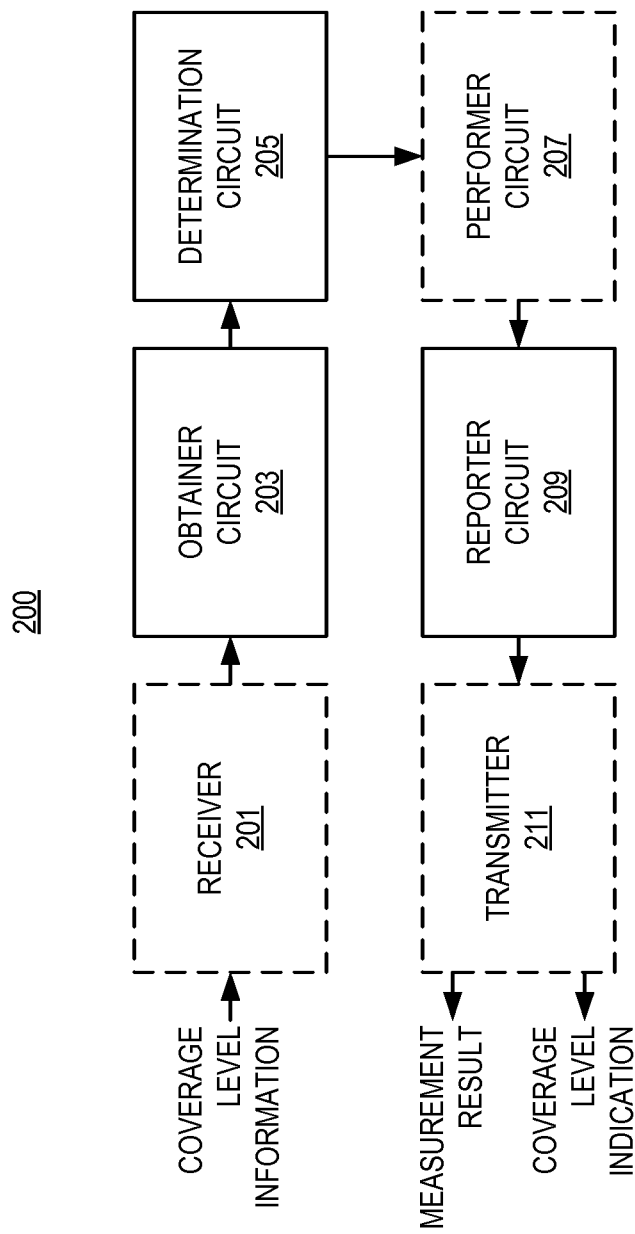
FIG. 2 illustrates one embodiment of a wireless device for determining a reporting configuration associated with a coverage level of the wireless device in accordance with various aspects as described herein.

FIG. 2 illustrates one embodiment of a wireless device 200 for determining a reporting configuration associated with a coverage level of the wireless device in accordance with various aspects as described herein. In FIG. 2, the wireless device 200 may include a receiver circuit 201, an obtainer circuit 203, a determination circuit 205, a performer circuit 207, a reporter circuit 209, a transmitter circuit 211, the like, or any combination thereof. The receiver circuit 201 may be configured to receive, from a network node, the information indicating a coverage level of the wireless device 200. The obtainer circuit 203 is configured to obtain the information indicating the coverage level of the wireless device 200. The determination circuit 205 is configured to determine, from amongst different reporting configurations respectively associated with different coverage levels of the wireless device, the reporting configuration associated with the coverage level indicated by the obtained information. The performer circuit 207 may be configured to perform a measurement of a signal transmitted or received by the wireless device 200. The reporter circuit 209 is configured to report a measurement result using the determined reporting configuration. The transmitter circuit 211 may be configured to transmit, to the network node, an indication of the coverage level of the wireless device.

Figure 3:
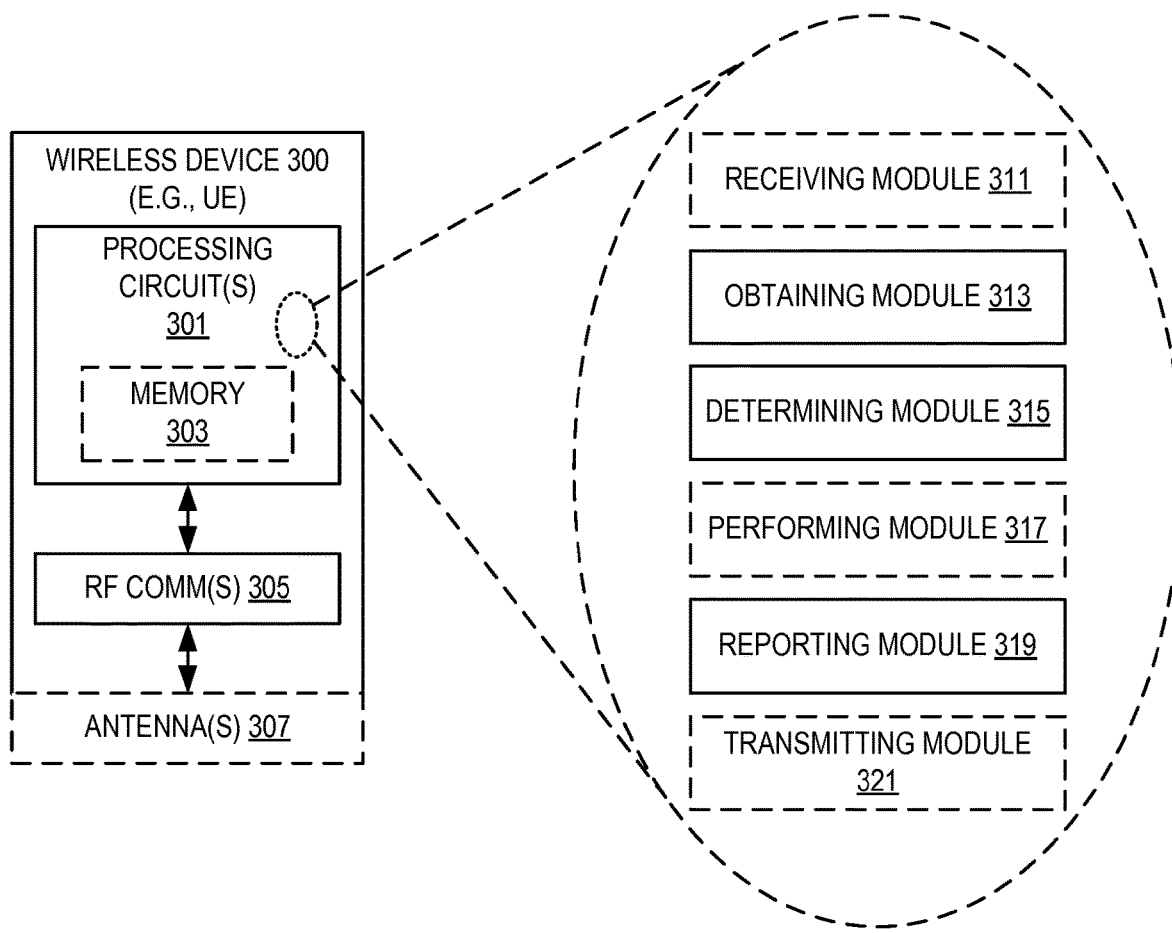
FIG. 3 illustrates another embodiment of a wireless device for determining a reporting configuration associated with a coverage level of the wireless device in accordance with various aspects as described herein.

FIG. 3 illustrates another embodiment of a wireless device 300 for determining a reporting configuration associated with a coverage level of the wireless device in accordance with various aspects as described herein. In FIG. 3, the wireless device 300 (e.g., UE) may include processing circuit(s) 301, radio frequency (RF) communications circuit(s) 305, antenna(s) 307, the like, or any combination thereof. The communication circuit(s) 305 may be configured to transmit or receive information to or from one or more network nodes or one or more other wireless devices via any communication technology. This communication may occur using the one or more antennas 307 that are either internal or external to the wireless device 300. The processing circuit(s) 301 may be configured to perform processing as described herein (e.g., the method of FIG. 5) such as by executing program instructions stored in memory 303. The processing circuit(s) 301 in this regard may implement certain functional means, units, or modules.

These functional means, units, or modules (e.g., for implementing the method of FIG. 5) may include a receiving module or unit 311 for receiving, from a network node in the wireless communication system, information indicating a coverage level of the wireless device. These functional means, units, or modules include an obtaining module or unit 313 for obtaining the information indicating the coverage level of the wireless device. These functional means, units, or modules include a determining module or unit 315 for determining, from amongst different reporting configurations respectively associated with different coverage levels of the wireless device, the reporting configuration associated with the coverage level indicated by the obtained information. These functional means, units, or modules may include a performing module or unit 317 for performing a measurement of a signal transmitted or received by the wireless device 300. These functional means, units, or modules include a reporting module or unit 319 for reporting a measurement result using the determined reporting configuration. These functional means, units, or modules may include a transmitting module or unit 321 for transmitting, to the network node, an indication of the coverage level of the wireless device.

Figure 4:
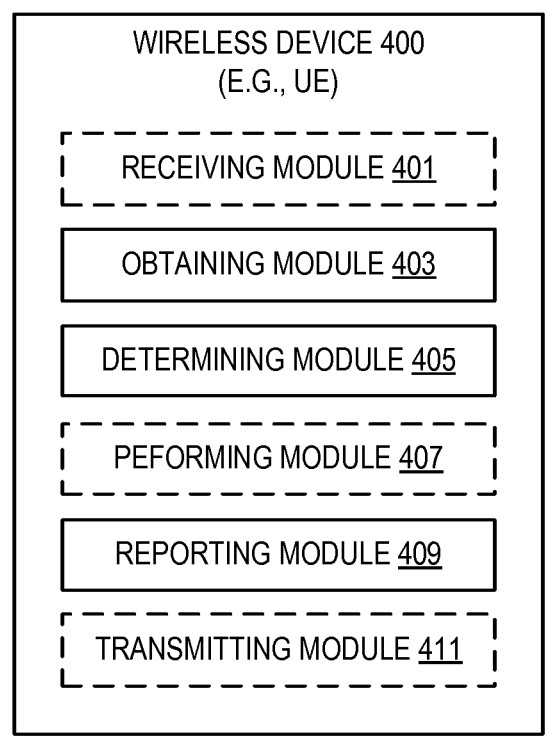
FIG. 4 illustrates another embodiment of a wireless device for determining a reporting configuration associated with a coverage level of the wireless device in accordance with various aspects as described herein.

FIG. 4 illustrates another embodiment of a wireless device 400 for determining a reporting configuration associated with a coverage level of the wireless device in accordance with various aspects as described herein. In FIG. 4, the wireless device 400 may implement various functional means, units, or modules (e.g., via the processing circuit(s) 301 of FIG. 3 or via software). These functional means, units, or modules (e.g., for implementing the method of FIG. 5) may include a receiving module or unit 401 for receiving, from a network node in the wireless communication system, information indicating a coverage level of the wireless device. Further, these functional means, units, or modules include an obtaining module or unit 403 for obtaining the information indicating the coverage level of the wireless device. Also, these functional means, units, or modules include a determining module or unit 405 for determining, from amongst different reporting configurations respectively associated with different coverage levels of the wireless device, the reporting configuration associated with the coverage level indicated by the obtained information. In addition, these functional means, units, or modules include may include a performing module or unit 407 for performing a measurement of a signal transmitted or received by the wireless device 400. These functional means, units, or modules include a reporting module or unit 409 for reporting a measurement result using the determined reporting configuration. Finally, these functional means, units, or modules may include a transmitting module or unit 411 for transmitting, to the network node, an indication of the coverage level of the wireless device.

Figure 5:
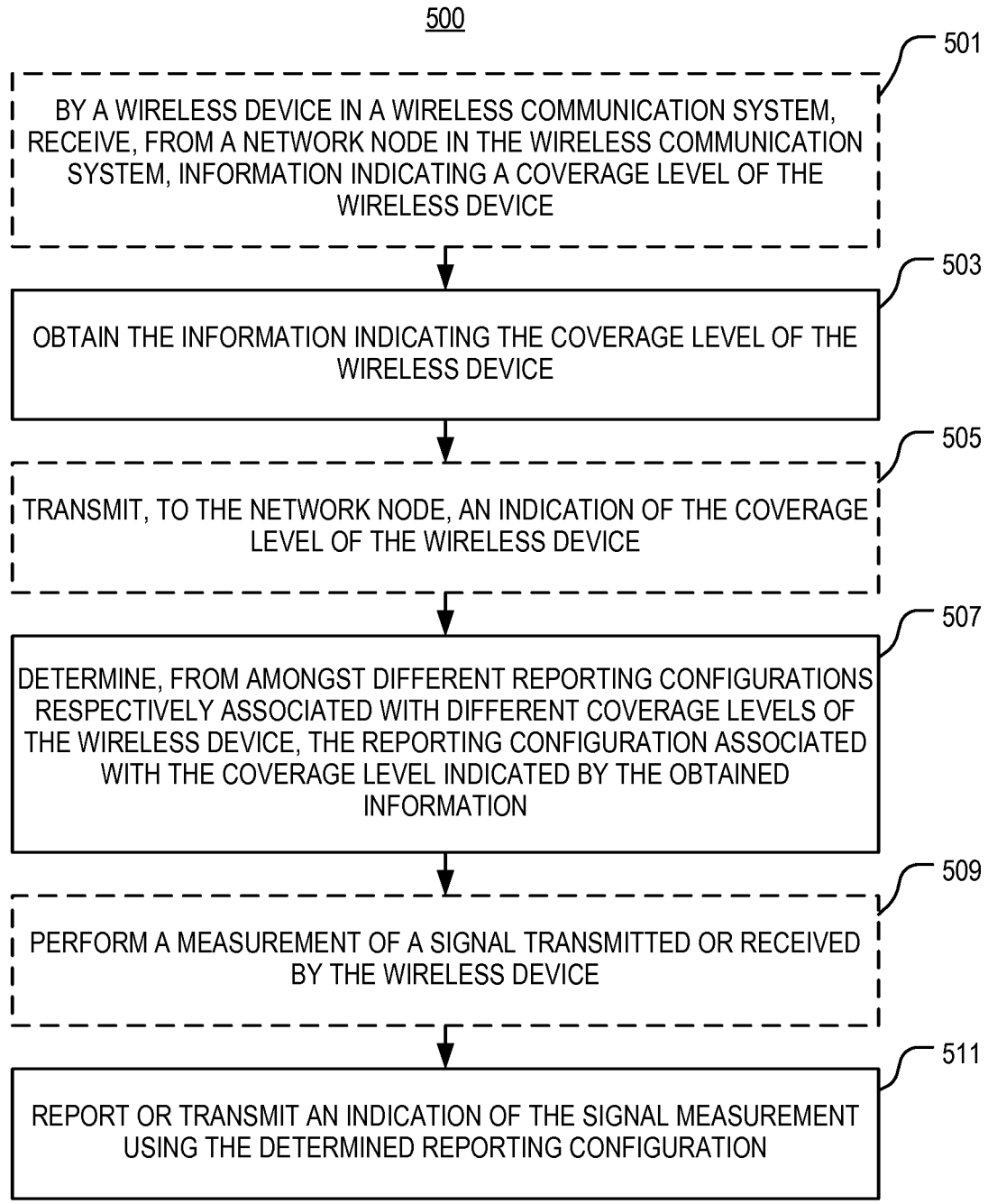
FIG. 5 illustrates one embodiment of a method by a wireless device for determining a reporting configuration associated with a coverage level of the wireless device in accordance with various aspects as described herein.

FIG. 5 illustrates one embodiment of a method 500 by a wireless device for determining a reporting configuration associated with a coverage level of the wireless device in accordance with various aspects as described herein. In FIG. 5, the method 500 may start, for instance, at block 501 where it may include receiving, from a network node in the wireless communication system, information indicating a coverage level of the wireless device. At block 503, the method 500 includes obtaining the information indicating the coverage level of the wireless device. At block 505, the method 500 may include transmitting, to the network node, an indication of the coverage level of the wireless device. At block 507, the method 500 includes determining, from amongst different reporting configurations respectively associated with different coverage levels of the wireless device, the reporting configuration associated with the coverage level indicated by the obtained information. At block 509, the method may include performing a measurement of a signal transmitted or received by the wireless device. At block 511, the method 500 includes reporting a measurement result using the determined reporting configuration.

Figure 6:
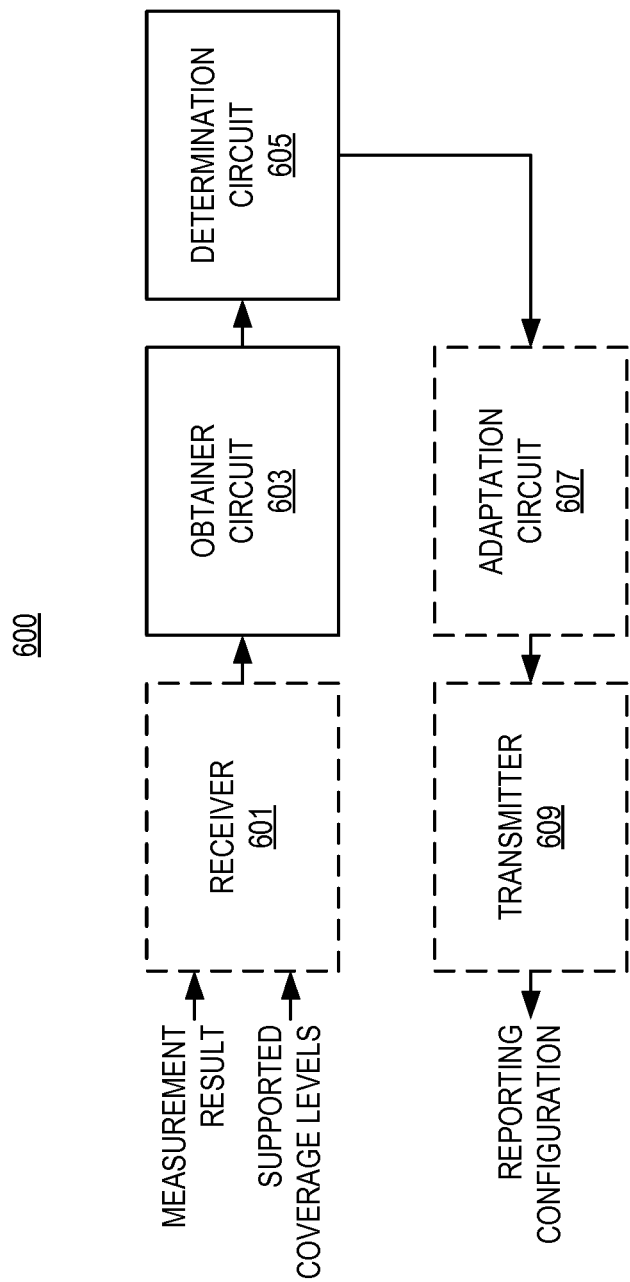
FIG. 6 illustrates one embodiment of a network node for determining a reporting configuration associated with a coverage level of a wireless device in accordance with various aspects as described herein.
Figure 7:
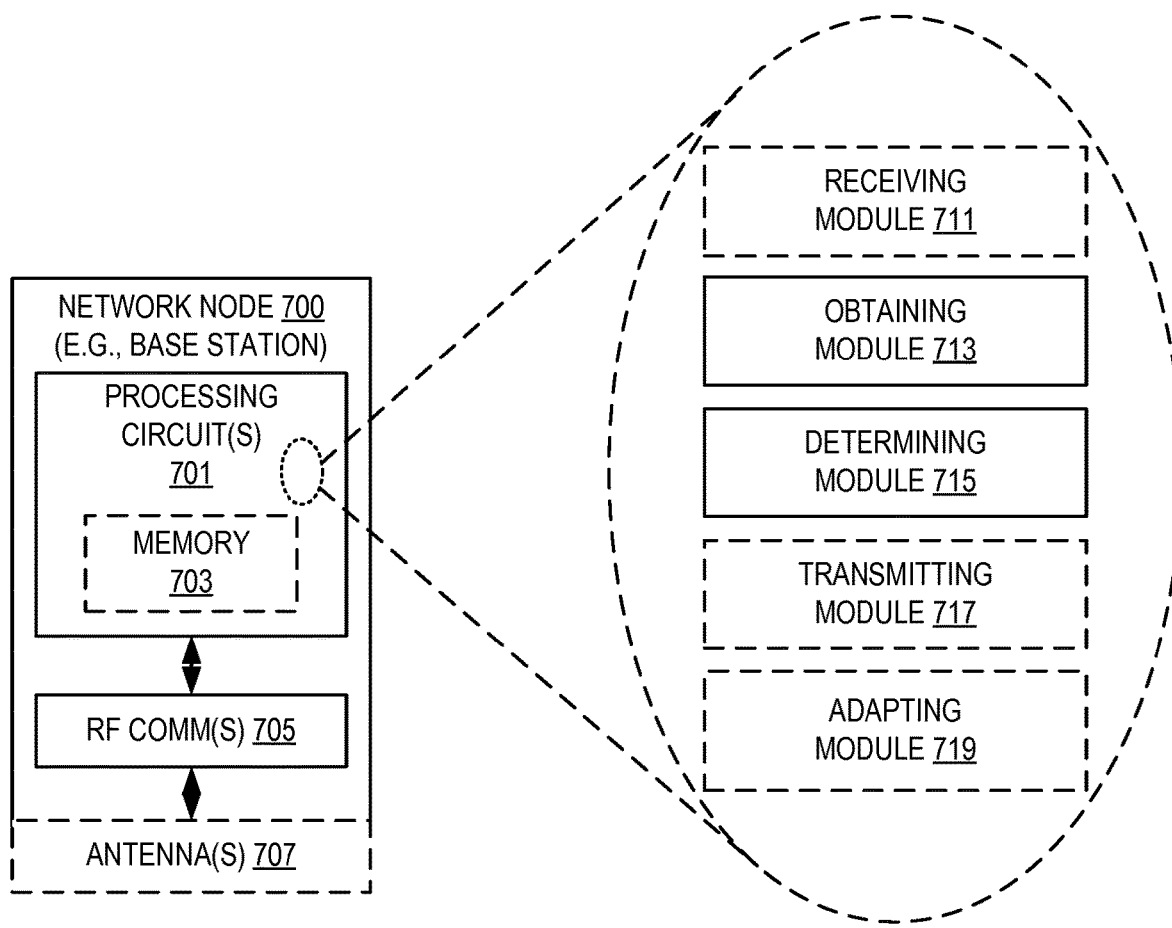
FIG. 7 illustrates another embodiment of a network node for determining a reporting configuration associated with a coverage level of a wireless device in accordance with various aspects as described herein.

FIG. 6 illustrates one embodiment of a network node 600 for determining a reporting configuration associated with a coverage level of a wireless device in accordance with various aspects as described herein. In FIG. 6, the network node 600 may include a receiver circuit 601, an obtainer circuit 603, a determination circuit 605, an adaptation circuit 607, a transmitter circuit 609, the like, or any combination thereof. The obtainer circuit 603 is configured to obtain information indicating a coverage level of a wireless device in the wireless communication system. The determination circuit 605 is configured to determine, from amongst different reporting configurations respectively associated with different coverage levels of the wireless device, the reporting configuration associated with the coverage level indicated by the obtained information. The adaptation circuit 607 may be configured to adapt one or more operational parameters that correspond to the wireless device based on the measurement result. The transmitter circuit 609 may be configured to transmit, to the wireless device, the determined reporting configuration. The receiver circuit 601 may be configured to receive, from the wireless device, a measurement result using the determined reporting configuration FIG. 7 illustrates another embodiment of a network node 700 for determining a reporting configuration associated with a coverage level of a wireless device in accordance with various aspects as described herein. In FIG. 7, the network node 700 (e.g., base station) may include processing circuit (s) 701, radio frequency (RF) communications circuit(s) 705, antenna(s) 707, the like, or any combination thereof. The communication circuit(s) 705 may be configured to transmit or receive information to or from one or more network nodes or one or more wireless devices via any communication technology. This communication may occur using the one or more antennas 707 that are either internal or external to the network node 700. The processing circuit (s) 701 may be configured to perform processing as described herein (e.g., the method of FIG. 9) such as by executing program instructions stored in memory 703. The processing circuit(s) 701 in this regard may implement certain functional means, units, or modules.

These functional means, units, or modules (e.g., for implementing the method of FIG. 9) may include a receiving module or unit 711 for receiving, from the wireless device, a measurement result using the determined reporting configuration. Further, these functional means, units, or modules include an obtaining module or unit 713 for obtaining information indicating a coverage level of a wireless device in the wireless communication system. Also, these functional means, units, or modules include a determining module or unit 715 for determining, from amongst different reporting configurations respectively associated with different coverage levels of the wireless device, the reporting configuration associated with the coverage level indicated by the obtained information. In addition, these functional means, units, or modules may include a transmitting module or unit 717 for transmitting, to the wireless device, the determined reporting configuration. Finally, these functional means, units, or modules may include an adapting module or unit 719 for adapting one or more operational parameters that correspond to the wireless device based on the measurement result.

Figure 8:
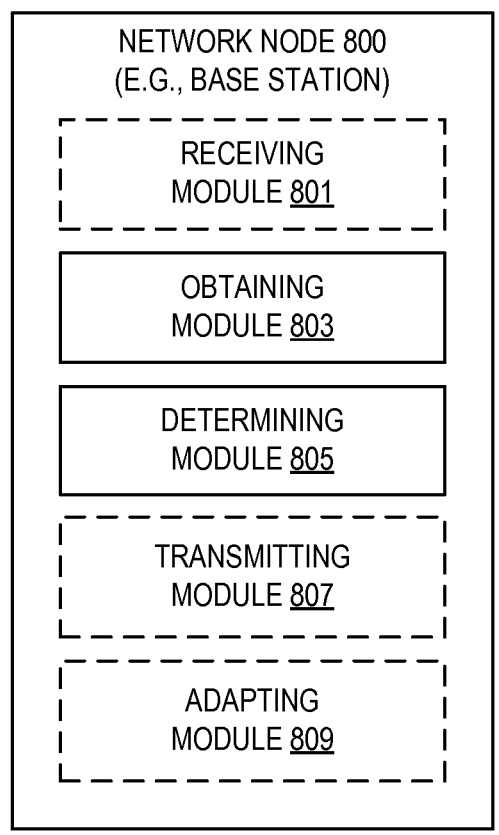
FIG. 8 illustrates another embodiment of a network node for determining a reporting configuration associated with a coverage level of a wireless device in accordance with various aspects as described herein.

FIG. 8 illustrates another embodiment of a network node 800 for determining a reporting configuration associated with a coverage level of a wireless device in accordance with various aspects as described herein. In FIG. 8, the network node 800 may implement various functional means, units, or modules (e.g., via the processing circuit(s) 701 of FIG. 7 or via software). These functional means, units, or modules (e.g., for implementing the method of FIG. 9) may include a receiving module or unit 801 for receiving, from the wireless device, a measurement result using the determined reporting configuration. Further, these functional means, units, or modules include an obtaining module or unit 803 for obtaining information indicating a coverage level of a wireless device in the wireless communication system. Also, these functional means, units, or modules include a determining module or unit 805 for determining, from amongst different reporting configurations respectively associated with different coverage levels of the wireless device, the reporting configuration associated with the coverage level indicated by the obtained information. In addition, these functional means, units, or modules may include a transmitting module or unit 807 for transmitting, to the wireless device, the determined reporting configuration. Finally, these functional means, units, or modules may include an adapting module or unit 809 for adapting one or more operational parameters that correspond to the wireless device based on the measurement result.

Figure 9:
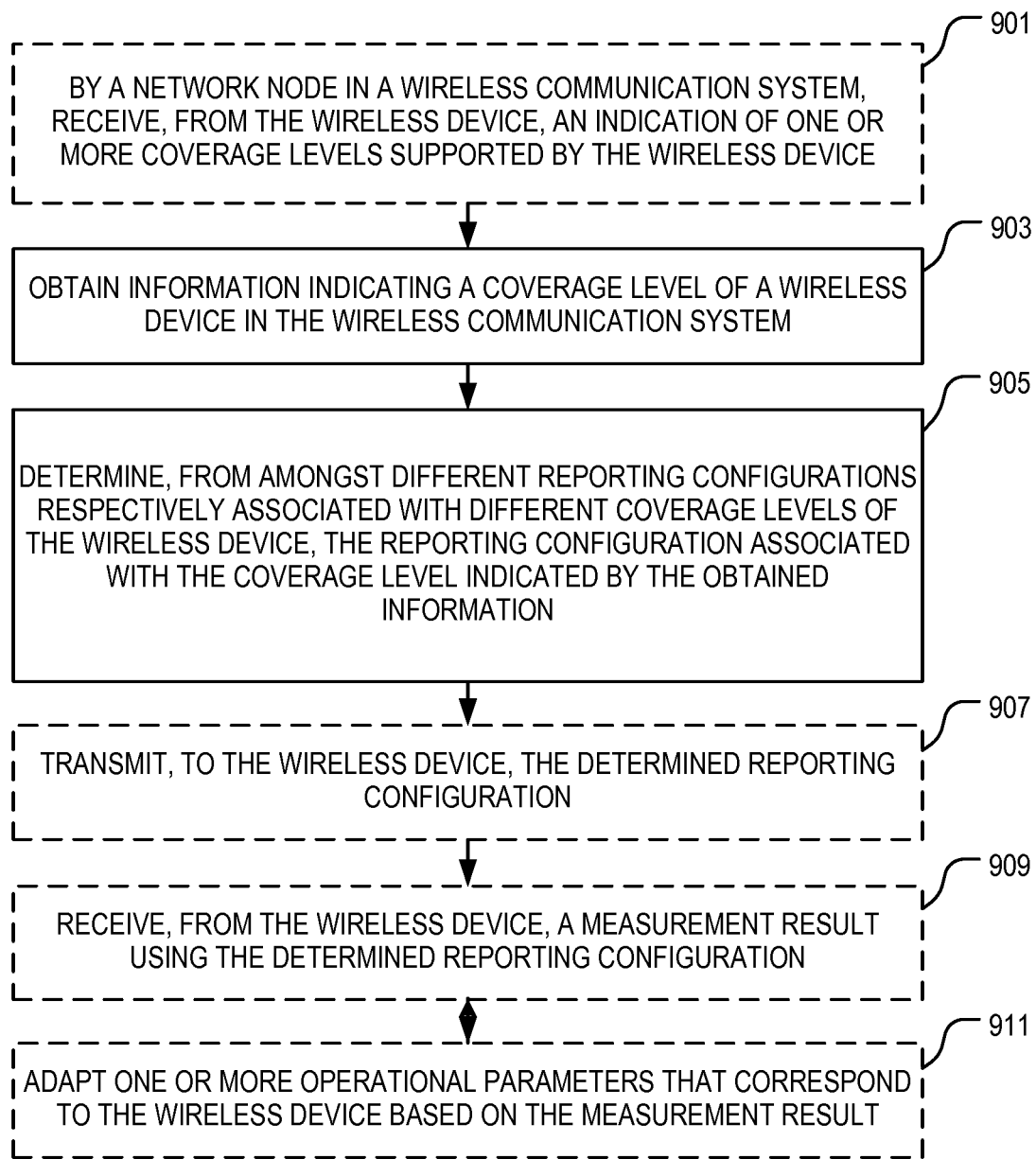
FIG. 9 illustrates one embodiment of a method by a network node for determining a reporting configuration associated with a coverage level of a wireless device in accordance with various aspects as described herein.

FIG. 9 illustrates one embodiment of a method 900 by a network node for determining a reporting configuration associated with a coverage level of a wireless device in accordance with various aspects as described herein. In FIG. 9, the method 900 may start, for instance, at block 901 where it may include receiving, from the wireless device, an indication of one or more coverage levels supported by the wireless device. At block 903, the method 900 includes obtaining information indicating a coverage level of a wireless device in the wireless communication system. At block 905, the method 900 includes determining, from amongst different reporting configurations respectively associated with different coverage levels of the wireless device, the reporting configuration associated with the coverage level indicated by the obtained information. At block 907, the method 900 may include transmitting, to the wireless device, the determined reporting configuration. At block 909, the method 900 may include receiving, from the wireless device, a measurement result using the determined reporting configuration. At block 911, the method 900 may include adapting one or more operational parameters that correspond to the wireless device based on the measurement result.

Figure 10:
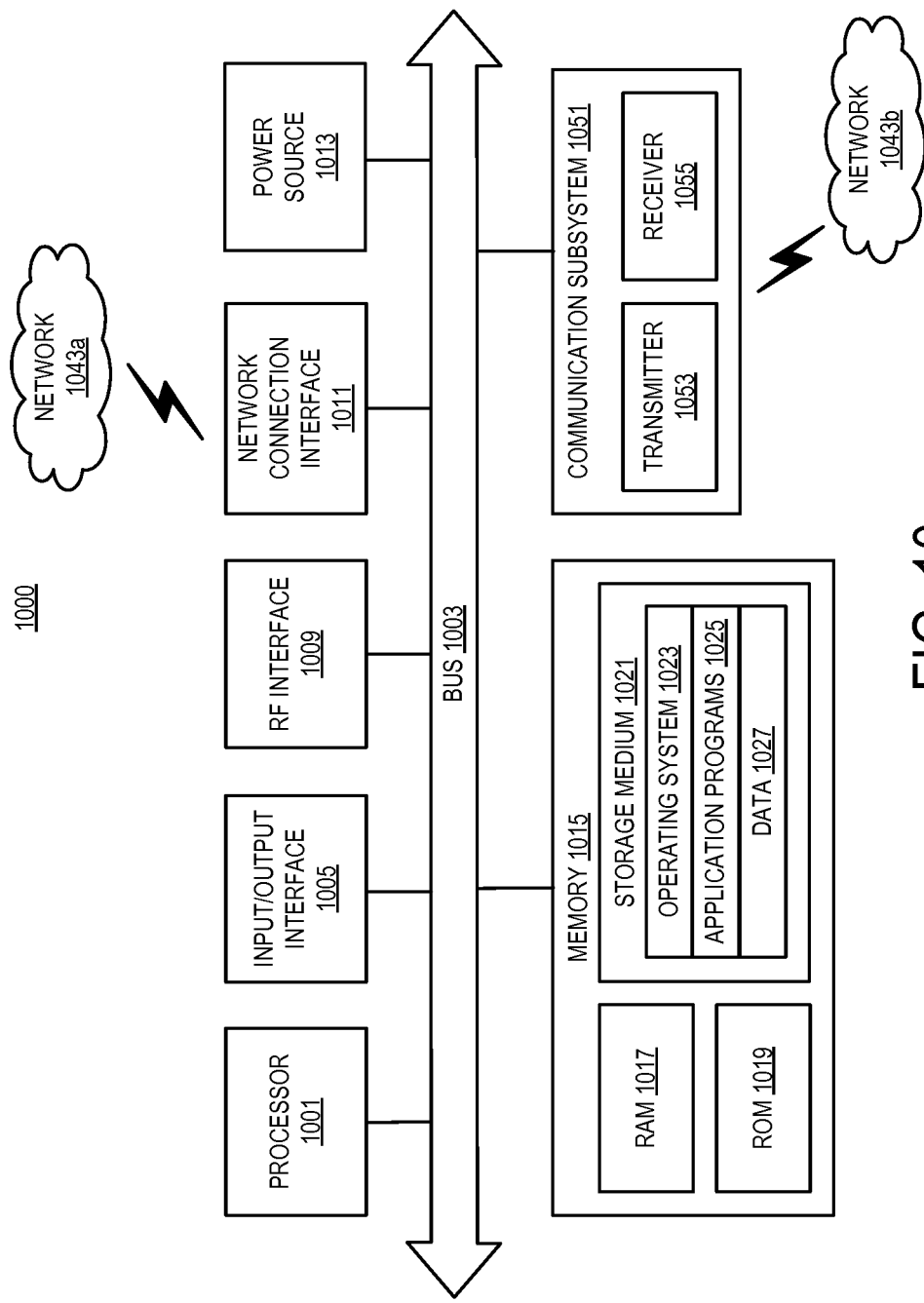
FIG. 10 illustrates another embodiment of a wireless device in accordance with various aspects as described herein.

FIG. 10 illustrates another embodiment of a wireless device 1000 in accordance with various aspects as described herein. In some instances, the wireless device 1000 may be referred as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 1000 may be a set of hardware components. In FIG. 10, the wireless device 1000 may be configured to include a processor 1001 that is operatively coupled to an input/output interface 1005, a radio frequency (RF) interface 1009, a network connection interface 1011, a memory 1015 including a random access memory (RAM) 1017, a read only memory (ROM) 1019, a storage medium 1021 or the like, a communication subsystem 1051, a power source 1033, another component, or any combination thereof. The storage medium 1021 may include an operating system 1023, an application program 1025, data 1027, or the like. Specific devices may utilize all of the components shown in FIG. 10, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 10, the processor 1001 may be configured to process computer instructions and data. The processor 1001 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 1001 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1005 may be configured to provide a communication interface to an input device, output device, or input and output device. The wireless device 1000 may be configured to use an output device via the input/output interface 1005. A person of ordinary skill will recognize that an output device may use the same type of interface port as an input device. For example, a USB port may be used to provide input to and output from the wireless device 1000. The output device may be a speaker, a sound card, a video card, a display, a monitor, a printer, an actuator, an emitter, a smartcard, another output device, or any combination thereof. The wireless device 1000 may be configured to use an input device via the input/output interface 1005 to allow a user to capture information into the wireless device 1000. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043a. The network 1043a may encompass wired and wireless communication networks such as a local-area network (LAN), a wide-area network (WAN), a computer network, a wireless network, a telecommunications network, another like network or any combination thereof. For example, the network 1043a may be a Wi-Fi network. The network connection interface 1011 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1011 may implement receiver and transmitter functionality appropriate to the communication network links (e.g., optical, electrical, and the like). The transmitter and receiver functions may share circuit components, software, or firmware, or alternatively may be implemented separately.

In this embodiment, the RAM 1017 may be configured to interface via a bus 1003 to the processor 1001 to provide storage or caching of data or computer instructions during the execution of software programs such as the operating system, application programs, and device drivers. In one example, the wireless device 1000 may include at least one hundred and twenty-eight megabytes (128 Mbytes) of RAM. The ROM 1019 may be configured to provide computer instructions or data to the processor 1001. For example, the ROM 1019 may be configured to be invariant low-level system code or data for basic system functions such as basic input and output (I/O), startup, or reception of keystrokes from a keyboard that are stored in a non-volatile memory. The storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1021 may be configured to include an operating system 1023, an application program 1025 such as a web browser application, a widget or gadget engine or another application, and a data file 1027.

In FIG. 10, the processor 1001 may be configured to communicate with a network 1043*b* using the communication subsystem 1051. The network 1043*a* and the network 1043*b* may be the same network or networks or different network or networks. The communication subsystem 1051 may be configured to include one or more transceivers used to communicate with the network 1043*b*. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMax, or the like.

In another example, the communication subsystem 1051 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMax, or the like. Each transceiver may include a transmitter 1053 or a receiver 1055 to implement transmitter or receiver functionality, respectively, appropriate to the RAN links (e.g., frequency allocations and the like). Further, the transmitter 1053 and the receiver 1055 of each transceiver may share circuit components, software or firmware, or alternatively may be implemented separately.

In the current embodiment, the communication functions of the communication subsystem 1051 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1051 may include cellular communication, Wi-Fi communication, Bluetooth communication, and GPS communication. The network 1043*b* may encompass wired and wireless communication networks such as a local-area network (LAN), a wide-area network (WAN), a computer network, a wireless network, a telecommunications network, another like network or any combination thereof. For example, the network 1043*b* may be a cellular network, a Wi-Fi network, and a near-field network. The power source 1013 may be configured to provide an alternating current (AC) or direct current (DC) power to components of the wireless device 1000.

In FIG. 10, the storage medium 1021 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1021 may allow the wireless device 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a computer-readable medium.

The functionality of the methods described herein may be implemented in one of the components of the wireless device 1000 or partitioned across multiple components of the wireless device 1000. Further, the functionality of the methods described herein may be implemented in any combination of hardware, software, or firmware. In one example, the communication subsystem 1051 may be configured to include any of the components described herein. Further, the processor 1001 may be configured to communicate with any of such components over the bus 1003. In another example, any of such components may be represented by program instructions stored in memory that when executed by the processor 1001 performs the corresponding functions described herein. In another example, the functionality of any of such components may be partitioned between the processor 1001 and the communication subsystem 1051. In another example, the non-computative-intensive functions of any of such components may be implemented in software or firmware and the computative-intensive functions may be implemented in hardware.

In one embodiment, a method performed by a UE that is capable of operating in at least two coverage levels includes obtaining information about a coverage enhancement level (CE) of the UE with respect to a second node (e.g., first cell (cell1) or another UE). Further, the method includes determining or selecting a reporting configuration based on the obtained information about the CE level of the first cell. Also, the method includes performing at least one measurement on signals received from or transmitted to a node (e.g., cell1 or another UE, UE2). In addition, the method includes reporting the result of the performed measurement to the first node (e.g., a network node or another UE) using the determined or selected reporting configuration.

In another embodiment, the method may include indicating to another node (e.g., network node) the obtained coverage level.

In another embodiment, the method may include storing all or a portion of the obtained information.

In another embodiment, the method may include selecting one of the already known or obtained reporting configuration based on the obtained information.

In one embodiment, a method by a network node managing or serving a UE capable of operating under at least two coverage levels includes obtaining information about a CE level of the UE with respect to a second node (e.g., first cell (cell1) or another UE, UE2). Further, the method includes determining based on the obtained information about the CE level of the UE with respect to the second node (e.g., cell1 or UE2), a reporting configuration to be used by the UE for transmitting to the first node, the results of measurement performed on the second node.

In another embodiment, the method may include receiving UE capability related to support of one or more coverage levels.

In another embodiment, the method may include sending the determined reporting configuration to the UE.

In another embodiment, the method may include adapting the scheduling based on determined and received reporting information indicating the results of the measurement.

In one embodiment, the first node (node1) and the second node (node2) may be different e.g. the UE performs measurement on neighbor cell and report results to the serving cell.

In another example the first node (Node1) and the second node (Node2) may be the same (e.g., the UE performs measurement on a serving cell and reports results to the same serving cell).

In some embodiments, the methods described herein may enable adaptive reporting by the UE depending on the coverage area in which it is operating. A UE which is operating in enhanced coverage may be power limited compared to a normal coverage UE. The reporting resolution may be limited in some cases for the low cost and low complexity UEs, and the method may allow the UE to adapt the reporting resolution based on its coverage area. This provides more accurate information on the reporting to the network node and results in more accurate decisions taken by the network node (e.g., better coding rate, better modulation schemes and better resources that match the actual channel conditions are selected by the network node).

In some embodiments, a network node corresponds to any type of radio network node or any network node that communicates with a UE or with another network node. Examples of a network node include a NodeB, master evolved NodeB (MeNB), secondary evolved NodeB (SeNB), network node belonging to a master cell group (MCG) or a secondary cell group (SCG), base station (BS), multi-standard radio (MSR) radio node such as a multi-standards radio base station (MSR BS), evolved NodeB (eNodeB), network controller (NC), radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center (MSC), mobility management entity (MME)), operations and management (O&M) node, operations support system (OSS) node, self-organizing network (SON) node, positioning node (e.g., evolved serving mobile location center (E-SMLC)), minimization of driving test (MDT) node, and the like.

In some embodiments, a UE corresponds to any type of wireless device communicating with a network node or with another UE in a cellular or mobile communication system. Examples of a UE include a target device, device-to-device (D2D) UE, proximity-capable UE (e.g., proximity services (ProSe) UE), machine-type UE or UE capable of machine-to-machine (M2M) communication, enhanced machine-type communications (eMTC) UE, personal digital assistant (PDA), pad, tablet, mobile terminal, smart phone, laptop embedded equipped (LEE) device, laptop mounted equipment (LME), USB dongle, and the like. A MTC-capable UE may also be defined in terms of a certain UE category. Examples of such UE categories include LTE UE category 0, LTE UE category M1, LTE UE category narrow band 1 (NB1), EC-GSM-IoT, and the like. Table 1 below summarizes various characteristics of these UE categories.

TABLE 1

Characteristics of Narrowband IoT UE Categories

| Characteristic | LTE Cat 1 | LTE Cat 0 | LTE Cat M1 (eMTC) | LTE Cat NB1 (NB-IoT) | EC-GSM-IoT |
| --- | --- | --- | --- | --- | --- |
| DL Peak Rate | 10 Mbps | 1 Mbps | 1 Mbps | 250 kbps | 474 kbps (EDGE) 2 Mbps (EGPRS2B) |
| UL Peak Rate | 5 Mbps | 1 Mbps | 1 Mbps | 250 kbps (multi-tone) 20 kbps (single-tone) | 474 kbps (EDGE) 2 Mbps (EGPRS2B) |
| Antenna(s) | 2 | 1 | 1 | 1 | 1-2 |
| Duplex Mode | Full | Full or Half | Full or Half | Half | Half |
| Rx Bandwidth | 1.08-18 MHz | 1.08-18 MHz | 1.08 MHz | 180 kHz | 200 kHz |
| Rx Chains | 2 (MIMO) | 1 (SISO) | 1 (SISO) | 1 (SISO) | 1-2 |
| Tx Power | 23 dBm | 23 dBm | 20/23 dBm | 20/23 dBm | 23/33 dBm |

In some embodiments, the methods described herein may include single carrier as well as multicarrier or carrier aggregation (CA) operation of the UE in which the UE is able to receive or transmit data to more than one serving cell. Carrier aggregation (CA) is also referred to as a multi-carrier system, multi-cell operation, multi-carrier operation, multi-carrier transmission or reception. In CA, one of the component carriers (CCs) is the primary component carrier (PCC), which is also referred to as a primary carrier or anchor carrier. The remaining CCs are referred to as secondary component carriers (SCCs), secondary carriers, or supplementary carriers. The serving cell is also referred to as a primary cell (PCell) or a primary serving cell (PSC). Similarly, a secondary serving cell (SSC) is also referred to as a secondary cell (SCell).

While some of the embodiments are described for LTE, these embodiments are applicable to any radio access technology (RAT) system or multi-RAT system such as LTE frequency division duplex (FDD), LTE time division duplex (TDD), wideband code division multiple access (WCDMA), high-speed packet access (HSPA), global system for mobile communications (GSM), enhanced data rates for GSM evolution (EDGE), GSM EDGE RAN (GERAN), Wi Fi, wireless local area network (WLAN), CDMA2000, 3GPP New Radio (NR), and the like.

Some of the embodiments apply for any RRC state (e.g., RRC_IDLE, RRC_CONNECTED).

In some embodiments, the terms UE and wireless device may be used interchangeably. The UE may be any type of wireless device capable of communicating with a network node or another UE over radio signals. The UE may also be a radio communication device, target device, D2D UE, machine-type UE, UE capable of M2M, low-cost or low-complexity UE, a sensor equipped with UE, tablet, mobile terminal, smart phone, LEE, LME, USB dongle, customer premises equipment (CPE), and the like.

In some embodiments, a network node is a base station, radio base station (RBS), base transceiver station (BSS), BSC, NC, RNC, eNB, Node B, core network node (e.g., MME), NodeG, positioning node (e.g. E-SMLC), multi-cell/multicast coordination entity (MCE), relay node, access point, radio access point, RRU, RRH, or the like. The network node may be interchangeably referred to as a radio network node.

In some embodiments, a node is a network node or a UE.

In some embodiments, the UE is configured with PCell and primary/secondary cell (PSCell) or with PCell, PSCell and one or more SCells such as in dual connectivity or carrier aggregation. The configured cells are UE specific (e.g., serving cells of the UE).

In some embodiment, the UE is served by a serving cell which has already been identified by the UE. The UE further identifies at least one other cell, which may be referred to as a target cell or neighbor cell.

In some embodiments, the serving cell and neighbor cell are served or managed by respective first and second network nodes. In some embodiments the serving cell and neighbor cell are served or managed by the same network node e.g. a first network node.

In some embodiments, a UE operates in a low or in high activity state. Examples of a low activity state include an RRC idle state, idle mode, and the like. Examples of a low activity state include an RRC CONNECTED state, active mode, active state, and the like. The UE may be configured to operate in discontinuous reception (DRX) or in non-DRX. If configured to operate in DRX, the UE may still operate according to non-DRX as long as it receives new transmissions from the network node.

In some embodiments, the UE may perform any type of one or more measurements (e.g., radio measurement) on any one radio signal or combination of radio signals transmitted in a cell in uplink or downlink. Further, the UE may report the results of the measurements to a network node. The results may be reported using a reporting configuration. An example of a reporting configuration is a measurement report mapping. The measurement report mapping is also interchangeably referred to as report mapping, measurement reporting range, reportable measurement values, measurement signaling range, measurement signaling mapping, and the like. At least two different measurement report mappings are available (e.g., pre-defined, configured by another node, or the like) for the same type of measurement for enabling the UE to signal the measurement results to a network node or to another UE. The report mapping includes at least three parameters: a minimum reportable measurement value, a maximum reportable measurement value, and at least one resolution or granularity between successive reportable values. A report mapping may include two or more report resolutions.

In some embodiments, the measurement may be performed by the UE on one or more serving cells or on one or more neighbor cells. Radio signals may be one or more physical signals such as reference signals or signals carrying a physical channel (e.g., PDSCH, PDCCH, enhanced PDCCH (E-PDCCH), PUSCH, PUCCH, or the like). A physical channel carries higher layer information. Examples of a downlink reference signal include a PSS, SSS, CRS, CSI-RS, PRS, and the like. Examples of an uplink reference signal include an SRS, DMRS, and the like. A reference signal (RS) is also interchangeably referred to as a discovery signal. Examples of a measurement which may be performed by the UE on downlink or uplink signals include a signal-to-interference and noise ratio (SINR), cell search (e.g., cell identification), power headroom (PH), RSRP, RSRQ, RS-SINR, common reference signal SINR (CRS-SINR), CSI-RSRP, CSI-RSRQ, sidelink RSRP (S-RSRP), CQI, CSI, UE receive-transmit time difference, downlink reference signal SINR (DRS-SINR), and the like. The PH is a difference between a maximum UE power and a transmitted power on a signal expressed in log scale (e.g., X dB). The PH may be performed on signals (e.g., RS) transmitted on any of uplink signals (e.g., PUCCH, PUSCH, PRACH, NPUSCH, NPUCCH, NRACH)

In some embodiments, the UE may operate under either normal coverage or enhanced coverage with respect to its serving cell. The enhanced coverage is also interchangeably referred to as extended coverage. The UE may also operate in a plurality of coverage levels (e.g. normal coverage, enhanced coverage level 1, enhanced coverage level 2, enhanced coverage level 3, and the like). The normal and extended coverage operations may typically take place on narrower UE RF bandwidth compared with the system bandwidth (e.g., cell bandwidth, cell transmission bandwidth, downlink system bandwidth, or the like). In some embodiments, the UE RF bandwidth may be the same as of the system bandwidth. Examples of a narrow RF bandwidth include 200 kHz, 1.4 MHz, and the like. Examples of a system bandwidth include 200 kHz, 1.4 MHz, 3 MHz, 5 MHz, 10, MHz, 15 MHz, 20 MHz, and the like. In case of extended/enhanced coverage, the UE may be capable of operating under a lower signal quality level (e.g., SNR, SINR, ratio of average received signal energy per subcarrier to total received power per subcarrier ($\hat{E}s/Iot$)), RSRQ, or the like) compared to its capabilities when operating in a legacy system. The coverage level enhancement may vary with the operational scenario and may also depend on the UE type. For example, a UE which is located in a basement with bad coverage may need a larger level of coverage enhancement (e.g., 10 dB) compared to a UE which is at a cell border (e.g., 5 dB). The coverage level may be expressed in terms of a received signal quality or received signal strength at the UE with respect to its serving cell, or a received signal quality or received signal strength at the serving cell with respect to the UE.

In some embodiments, the coverage level of the UE or CE level may also be defined with respect to any cell such as a neighbor cell. For example, in terms of received signal quality or received signal strength at the UE with respect to a target cell on which the UE performs one or more radio measurements. Examples of signal quality are SNR, SINR, CQI, RSRQ, CRS $\hat{E}s/Iot$, SCH $\hat{E}s/Iot$, and the like. Examples of signal strength are path loss, RSRP, SCH_RP etc. The notation $\hat{E}s/Iot$ is defined as the ratio of $\hat{E}s$ to Iot.

Ês is the received energy per resource element (e.g., power normalized to the subcarrier spacing) during the useful part of the symbol (e.g., the portion of the symbol that excludes the cyclic prefix) at the UE antenna connector. Iot is the received power spectral density of the total noise and interference for a certain resource element (e.g., power integrated over the resource element and normalized to the subcarrier spacing) as measured at the UE antenna connector. In one example, two coverage levels defined with respect to a signal quality (e.g., SNR) at the UE includes coverage enhancement level 1 (CE1) with an SNR≥−6 dB at UE with respect to its serving cell, and coverage enhancement level 2 (CE2) with a −12 dB≤SNR<−6 dB at UE with respect to its serving cell. In another example, four coverage levels includes CE1, CE2, coverage enhancement level 3 (CE3) with a −15 dB≤SNR<−12 dB at UE with respect to its serving cell, and coverage enhancement level 4 (CE4) with a −18 dB≤SNR<−15 dB at UE with respect to its serving cell. In these examples, the CE1 may also be interchangeably referred to as a normal coverage level, baseline coverage level, reference coverage level, legacy coverage level, or the like. On the other hand, CE2-CE4 may be termed as enhanced coverage, extended coverage level, or the like.

In yet another example, two different coverage levels (e.g. CE mode A and CE mode B) may be defined. The UE category X meets requirements for CE Mode A (i.e., CEModeA) for a cell provided that the UE category X is configured with CE Mode A and the cell's synchronization channel (SCH) Ês/Iot≥−6 dB and cell-specific reference signal (CRS) Ês/Iot≥−6 dB. The UE category X meets requirements for CE Mode B (i.e., CEModeB) provided that the UE category X is configured with CE Mode B and the cell's SCH Ês/Iot≥−15 dB and CRS Ês/Iot≥−15 dB. An example of UE category X is UE category M1 (e.g., RF bandwidth of 1.4 MHz). The CE Mode A and B are also interchangeably referred to as respective normal and enhanced coverage levels.

In yet another example, two different coverage levels (e.g., normal and enhanced coverages) may be defined in terms of signal quality levels. The requirements for normal coverage are applicable for UE category M1 with respect to a cell provided that radio conditions of the UE with respect to that cell are defined as SCH Ês/Iot≥−6 dB and CRS Ês/Iot≥−6. The requirements for enhanced coverage are applicable for UE category M1 with respect to a cell provided that radio conditions of the UE with respect to that cell are defined as follows SCH Ês/Iot≥−15 dB and CRS Ês/Iot≥−15.

In these examples, Ês/Iot is the ratio of received power per subcarrier to the total interference including noise per subcarrier. For instance, the UE for UE category NB1 (e.g. RF bandwidth of 200 KHz) is not configured with different CE modes but the two different coverage levels differ in terms of their lowest supported signal qualities as mentioned above.

In one embodiment, a method in a UE that is capable of operating under at least two coverage levels includes obtaining information about a CE level of the UE with respect to a node (e.g., first cell (cell1) or another UE, UE2). Further, the method includes determining a reporting configuration for transmitting measurement results based on the obtained information about the CE level of cell1. Also, the method includes performing at least one measurement on signals received from or transmitted to a node (e.g. cell1 or another UE, UE2). In addition, the method includes reporting or transmitting the result of the performed measurement to a node (e.g. network node or another UE) using the determined/selected reporting configuration.

In another embodiment, the method may include indicating to another node (e.g., network node) the obtained coverage level.

In another embodiment, the method may include storing the obtained information, at least a part of it.

In another embodiment, the method may include selecting one of the already known or obtained reporting configuration based on the obtained information.

In some embodiments, the reporting configuration may include a reporting of radio resource management (RRM) measurements (e.g., RSRP, RSRQ, NRSRP, NRSRQ, or the like). However, the reporting configuration may also include reporting of power headroom information in the UE to the network node. The reporting configuration may include information on the minimum reportable value, the maximum reportable value, the resolution, or the like. All types of reporting is expected to take place in a higher activity state of the UE (e.g., RRC_CONNECTED state).

In some embodiments, the information about a CE level of the UE with respect to a first cell served by or managed by a first network node may be obtained based on one or more of the following:
- an indication of whether the UE is under enhanced coverage of a serving cell;
- an indication of whether the UE is under a specific coverage level (e.g., CE level 2) of a serving cell;
- the information about a CE for a cell may further include an indication of whether the cell supports UE operation under enhanced coverage;
- a radio measurement (e.g., measurement of signals transmitted in cent measurement of interference or noise level, a signal level, a signal quality, timing measurement, or the like);
- evaluation with respect to one or more conditions or criteria;
- a random access configuration for transmitting a second message (M2) in cell1;
- UE capability to support a certain one or more coverage levels;
- assistance from a network node related to the coverage level (e.g., comprising any one or more of applicable or suggested coverage level, a threshold (H), or the like);
- indicator indicating normal coverage or enhanced coverage should be considered for operating with respect to cell2;
- history or past statistics (e.g., assume certain coverage level provided that coverage level has been used by the UE with respect to cell1 at least L % of the time); and
- stored information in the UE regarding coverage level with respect to cell1.

As another example of the radio measurement, if SINR or SNR of cell1 is below −6 dB, then the UE assumes that cell1 is in enhanced coverage. However, if SINR or SNR of cell1 is equal to or larger than −6 dB, then the UE assumes that cell1 is in normal coverage.

For the evaluation with respect to one or more conditions or criteria, this may be expressed in terms of the number of repetitions (R) used for random access transmissions on cell1 (e.g., R≤8 for normal coverage of UE with respect to cell1, and R>8 for enhanced coverage of UE with respect to cell1).

In some embodiments, other terms may be used instead of normal and enhanced coverage to indicate the same (e.g., CE Mode A or CE Mode B).

In some embodiments, the UE may be determined to be in a first coverage level (CE1) with respect to cell1 provided that the value of the UE radio measurement (e.g., signal quality) results of cell1 is above or equal to a threshold (H) and the UE is considered to be in a second coverage level (CE2) with respect to cell1 provided that the value of the UE radio measurement results of cell1 is below H. Cell1 may be a serving cell or a non-serving cell (e.g., neighbor cell). In the latter case, cell1 may be operating on the serving carrier frequency or on a non-serving carrier frequency.

In some embodiments, the UE may determine one reporting configuration out of at least two possible configurations for report measurement results for cell1 to a network node based on at least the determined coverage level of cell1.

In some embodiments, the step of determining the reporting configuration to be used by UE for reporting measurement results to a network node may include one or more of:
  determining the reporting configuration based on a pre-defined rule;
  selecting from a set of pre-defined time periods;
  selecting based on a condition;
  calculating the reporting configuration based on available resource;
  receiving a message or indicator from another node (e.g., a network node);
  determining based on a value or using a value received from another node (e.g., a network node); and
  determining based on history or stored information.

The step of determining the reporting configuration based on a pre-defined rule may include two possible CE levels. The UE may determine to use a first reporting configuration if the UE coverage level with respect to cell1 is CE1 and a second reporting configuration if the UE coverage level with respect to cell1 is CE2. For example, CE1 and CE2 may be respective CE Mode A and CE Mode B. The step of selecting from a set of pre-defined time periods may include each time period having a time measurement period of the measurement performed on cell1. For instance, the UE may determine to use a first reporting configuration if the time period is below a threshold and a second reporting configuration otherwise.

The step of selecting the reporting configuration based on a condition may include one or more of the following conditions:
  if the signal quality of cell1 is above or equal to a threshold (G);
  if the signal quality of cell1 is below the threshold (G);
  if the signal quality of cell1 is above or equal to a threshold (G) for longer than a time period Ty (e.g., Ty>Tx); and
  if the signal quality of cell1 is below a threshold (G) for longer than a time period Ty (e.g. Ty>Tx).

In some embodiments, a UE may not use more than a certain number of bits for reporting when operating in a certain mode (e.g., coverage enhancement mode).

In some embodiments, one type of configuration reporting that is used by the UE to report results of the measurement to the network node is the power headroom report mapping. Power headroom reporting is used by the UE to inform the serving network node about the power usage (e.g., amount of transmission power available at the UE). This information is later used by the uplink scheduler to adapt the transmission parameters (e.g., modulation scheme, coding rate, resources, or the like). The power headroom is defined as the difference between the nominal maximum output power and the estimated output power. It is typically expressed in log scale. It is also measured and reported per component carrier in case the UE is configured with multicarrier operation (e.g., carrier aggregation (CA), dual carrier (DC), or the like). An NB-IOT UE is one type of low cost and low complexity UE. For this UE, the power headroom is defined as follows:

$$PH(i) = P_{CMAX,c}(i) - \{P_{0\_NPUSCH,c}(1) + \alpha_c(1)PL_c\} \qquad \text{Equation 1}$$

The value of PH(i) may be either negative or positive. A negative value means that the serving network node has scheduled this UE with a data rate higher than what the UE may handle (e.g., UE is limited by $P_{CMAX,c}$). A positive value on the other hand means that the UE has power left (e.g., UE is not using the maximum power or may handle a higher data rate than currently scheduled).

The NB-IOT UE reports the power headroom information using the message 3 (Msg3) in random access procedure using two bits for the lowest configured NB-PRACH repetition level. This means that four different values may be reported compared to sixty-four values with legacy LTE, see Table 2 below. It is clear that the existing resolution cannot be maintained since only four values may be reported by the NB-IOT UE.

TABLE 2

Legacy LTE power headroom report mapping

| Reported value | Measured quantity value (dB) |
| --- | --- |
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| . . . | . . . |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

In comparison to legacy LTE, only lower-order modulation schemes are supported for NB-IOT such as binary phase shift keying (BPSK) and quadrature phase shift keying (QPSK). For LTE, higher order modulation schemes are supported such as QPSK, 16 quadrature amplitude modulation (QAM) and 64 QAM.

A UE in normal coverage may experience good channel quality similar to legacy LTE while a UE in enhanced coverage may have much poorer channel quality. From a power headroom reporting perspective, UE may operate using the maximum power in enhanced coverage compared to normal coverage. Therefore it is relevant to have a higher reporting resolution in the lower reporting range (negative values), i.e. it is highly likely that this UE is power-limited. When UE is power-limited, the PH(i) will be negative, therefore it is reasonable and important to have higher resolution on the negative values so that more accurate values may be reported to the network node. This will in turn result in that more suitable scheduling resources that match actual coverage conditions are selected by the network node. This will improve the uplink reception performance in the network node. One example of such reporting configuration that may be used in enhanced coverage with higher granularity in negative values is given in Table 3. In this example, it is assumed that UE cannot report a limited number of values (e.g., 4).

In normal coverage, on the other hand, it is more relevant to have higher reporting resolution/granularity in the higher reporting range (positive values) since UE is in good coverage and it may not always be necessary to use the maximum power, or the highest repetitions. Therefore it is highly likely that PH(i) is often positive, and thus better resolution on the positive values are desired. One example of such reporting configuration with better resolution on the positive values is given in Table 3.

TABLE 3

NB-IOT power headroom report mapping in normal coverage

| Reported value | Measured quantity value (dB) |
| --- | --- |
| POWER_HEADROOM_0 | $-23 \leq PH < 4$ |
| POWER_HEADROOM_1 | $4 \leq PH < 16$ |
| POWER_HEADROOM_2 | $16 \leq PH < 28$ |
| POWER_HEADROOM_3 | $PH \geq 28$ |

TABLE 4

NB-IOT power headroom report mapping in enhanced coverage

| Reported value | Measured quantity value (dB) |
| --- | --- |
| POWER_HEADROOM_0 | $-23 \leq PH < -11$ |
| POWER_HEADROOM_1 | $-11 \leq PH < 1$ |
| POWER_HEADROOM_2 | $1 \leq PH < 13$ |
| POWER_HEADROOM_3 | $PH \geq 13$ |

There is a clear advantage in having the reporting configuration of the measurement results that depends on the actual coverage level UE is operating in instead of having a fixed reporting configuration that is always used. This will provide the serving network node with more accurate information on the actual power usage in the UE, and the network node may then adapt its scheduling resources accordingly.

Different algorithms may be used to determine the exact reporting configuration. For example, when the UE is in normal coverage, a simple algorithm may be used (e.g., multiplication by 1). On the other hand, when the UE is in a different coverage level, a similar algorithm may be used (e.g., multiplication by 2, which will also decrease the resolution). Examples of other algorithms are subtraction, addition, division by different factors, all of which may depend on the actual coverage mode. In some cases, a combination of these algorithms may be used (e.g., multiplication by factor 1 in lower ranges and multiplication by factor 4 in higher ranges). In another example, multiplication may be used in lower ranges while addition may be used in higher ranges.

Figure 11:
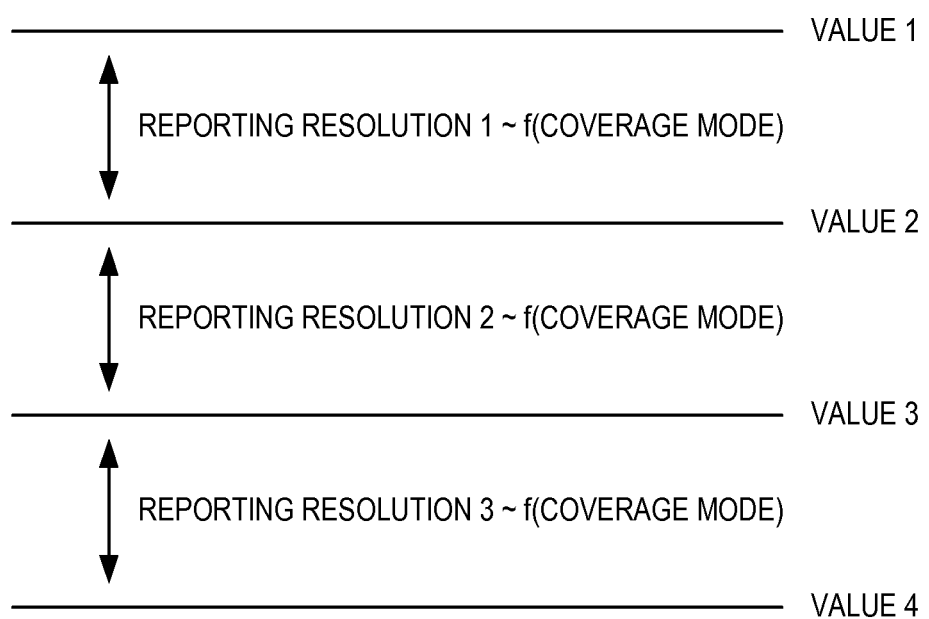
FIG. 11 illustrates a reporting configuration as a function of coverage mode in accordance with various aspects as described herein.

In one example, it is assumed that the UE is only capable of reporting four different values. In this case, the UE may adapt its reporting ranges and reporting resolution as a function of actual coverage mode, as shown in FIG. 11.

The reporting configurations in Table 3 and Table 4 are exemplified for power headroom reporting only. However, the same principle of adapting the reporting ranges and the reporting resolution as a function of the operating coverage mode may apply to all types of reporting. Examples of other types of reporting are RRM measurement reporting, signal quality reporting, signal strength reporting, positioning measurement reporting, timing information reporting, and the like.

In some embodiments, the UE may perform at least one measurement on uplink signals transmitted by the UE to cell1 or on DL signals received at the UE from cell1. The UE may perform the measurement based on a measurement configuration received from a node (e.g., from a network node or another UE). Cell1 herein may be a serving cell or a neighbor cell. The UE may also perform measurement on a plurality of cells. In another example, the UE may also perform the measurement on signals transmitted by the UE to another UE (e.g., UE2) or on signals received at the UE from another UE (e.g., UE2).

In some embodiments, the UE may report the results of the measurement performed on cell1 to a node (e.g., network node or another UE) using the determined or selected reporting configuration (e.g., the determined measurement report mapping).

In some embodiments, the UE reports the results of the measurement performed on UE2 to a node (e.g., network node or another UE) using the determined or selected reporting configuration (e.g., the determined measurement report mapping).

Examples of measurement results include a value of the performed measurement, identifier of a predefined value of the measurement result, absolute value of the results, and the like. Examples of reporting configurations for reporting measurement results include power headroom reporting, RRM measurement (e.g., RSRP, RSRQ, NRSRP, NRSRQ) reporting, signal strength reporting, signal quality reporting, load balancing information reporting, and the like).

The step of performing a reporting of the results of the measurements may further include one or more of the following procedures or operational tasks:
  performing RRM measurement on the serving cell;
  performing RRM measurement on neighboring cells;
  performing synchronization to neighboring nodes;
  reading system information of neighboring cells (e.g., reading MIB or one or more SIBs);
  receiving scheduling information from the serving network node;
  estimating the power usage;
  sending a control channel to cell1 (e.g., PUCCH or MPUCCH); and
  sending a control channel to cell1 (e.g. PUSCH).

In one embodiment, a method may be performed in a first node that serves or manages a UE that performs at least one measurement on a second node and reports results to the first node. A node may be a network node or another UE. The UE in this case is capable of operating under at least two coverage levels. The method performed by the first node includes obtaining information about a CE level of the UE with respect to a second node (e.g., first cell (cell1) or another UE, UE2). Further, the method includes determining a reporting configuration to be used by the UE for transmitting to the first node the results of measurements performed on the second node based on the obtained information about the CE level of the UE with respect to the second node (e.g., cell1 or UE2).

In another embodiment, the method may include receiving UE capability related to support of one or more coverage levels.

In another embodiment, the method may include sending the determined reporting configuration to the UE.

In another embodiment, the method may include adapting the scheduling based on determined and received reporting information indicating the results of the measurement.

In another embodiment, the first node (Node1) and the second node (Node2) may be different (e.g., the UE performs measurements on a neighbor cell and reports the results to the serving cell).

In another embodiment, the first node (Node1) and the second node (Node2) may be the same (e.g., the UE performs measurements on a serving cell and reports the results to the same serving cell).

In another embodiment, the first node may acquire information about the capability of the UE in terms of support for one or more coverage levels. The capability information is typically signaled by the UE to the serving node. The step of determining the reporting configuration may be based on this UE capability information. For example, a UE may or may not be capable of operating under different coverage levels. The first node may acquire the UE capability information for multiple coverage levels from the UE or from another network node that contains such information.

In another embodiment, the step of determining the reporting configuration may be similar to those described for a radio node.

In another embodiment, the step of determining the reporting configuration may be similar to those described for a radio node, but may be based on a coverage level of at least a second node (e.g., cell1 or UE2).

In another embodiment, the first node may transmit or signal information related to the determined reporting configuration to other network nodes. Examples of other nodes include neighbor network nodes, core network nodes, positioning node, any type of relay node, UE, D2D UE, MTC UE, or any other node used for dedicated services such as self-organizing network (SON) node. The information reporting configuration is signaled by the node to other UEs or nodes that are configured to operate under multiple coverage levels, or nodes that are serving or managing UEs operating under multiple coverage levels. There are significant benefits in sharing the determined information with other nodes. One benefit is that this information may be applicable to UEs in its neighbor network nodes, and in that case it may be reused directly by signaling them to their own users. This way, the reporting is improved in large scale. A second benefit is that the determination of reporting configurations which may be quite complex sometimes, may be done in one place and only once, and then signaled to other nodes in the network. This way, processing in the network node may be reduced. The signaling of information related to reporting configuration may be done in a periodic, event-triggered, or event-triggered periodic basis. Event-triggered means that it is signaled whenever the reporting is performed or configuration or coverage level is changed.

In another embodiment, the first node may use the received reporting information indicating the results of the measurements that are performed using the determined reporting configuration for operational tasks. Examples of operational tasks include scheduling, mobility, positioning, and the like. For example, if the received power headroom information indicates that there is power left after transmission using the granted resources, then the node may choose an even higher-order modulation scheme compared to what was previously used. This way the transmission resources are adapted according to actual power usage in the UE which will result in efficient usage of the resources, and hence faster transmission. In a second example, the received reporting information may better reflect the actual channel measurement result since the used reporting configuration will be based on actual coverage level. This will in turn improve all other operational procedures that use this measurement (e.g., handover, mobility, cell change, neighbor cell measurements, and the like).

In one embodiment, a method performed by a UE that is capable of operating under at least two coverage levels includes obtaining information about a CE level of the UE with respect to a second node (e.g., first cell (cell1) or another UE). Further, the method includes determining a reporting configuration based on the obtained information about the CE level of cell1. Also, the method includes performing at least one measurement on signals received from or transmitted to a node (e.g., cell1 or another UE, UE2). In addition, the method includes reporting or transmitting the result of the performed measurements to a first node (e.g., network node or another UE) using the determined/selected reporting configuration.

In another embodiment, the method may include indicating to another node (e.g., network node) the obtained coverage level.

In another embodiment, the method may include storing the obtained information, at least a part of it.

In another embodiment, the method may include selecting one of the already known or obtained reporting configuration based on the obtained information.

In one embodiment, a method performed by a first node managing or serving a UE capable of operating under at least two coverage levels includes obtaining information about a CE level of the UE with respect to a second node (e.g., first cell (cell1) or another UE, UE2). Further, the method includes determining a reporting configuration to be used by the UE for transmitting to the first node the results of measurements performed on the second node based on the obtained information about the CE level of the UE with respect to the second node (e.g., cell1 or UE2).

In another embodiment, the method may include receiving UE capability related to support of one or more coverage levels.

In another embodiment, the method may include sending the determined reporting configuration to the UE, In another embodiment, the method may include adapting the scheduling based on determined and received reporting information indicating the results of the measurement.

In another embodiment, the first node (Node1) and the second node (Node2) may be different nodes (e.g., the UE performs measurement on neighbor cell and report results to the serving cell).

In another example the first node (Node1) and the second node (Node2) may be the same node (e.g., the UE performs measurement on a serving cell and report results to the same serving cell). 3GPP RAN1 has discussed power headroom for NB-IOT. 3GPP RAN1 recommends to support transmission of narrowband power header room (NB-PHR) report with Msg3 of random access procedure using two bits for the lowest configured NB-PRACH repetition level, subject to 3GPP RAN2 confirmation of available bits. Further, dynamic indication utilizing DCI is not supported and the Msg3 size may remain the same. 3GPP RAN1 has also agreed to use two bits for power headroom report. NB-PHR is computed based on a 15 kHz single-tone transmit power for NB-PUSCH data transmission regardless of the actual subcarrier spacing where the power headroom (PH(i)) is defined by Equation 1 above. Further, there may be four reportable values of NB-PHR.

Power headroom reporting is used by the UE to inform the serving eNB about the power usage, i.e. amount of transmission power available at the UE. This information is later used by the uplink scheduler to adapt the transmission parameters, e.g. modulation scheme, coding rate, and resources. The power headroom is defined as the difference between the nominal maximum output power and the estimated output power. It is typically expressed in log scale. It is also measured and reported per component carrier in case the UE is configured with multiple carrier operation. For NB-IOT, the power headroom (PH(i)) is defined by Equation 1 above.

The value of PH(i) may be either negative or positive. A negative value means that the serving eNB has scheduled this UE with a data rate higher than what the UE may handle (e.g., UE is limited by $P_{CMAX,c}$). A positive value on the other hand means that UE has power left (e.g., it is not using the maximum power or may handle a higher data rate).

The NB-PHR may be reported in Msg3 of random access procedure using 2 bits for the lowest configured NB-PRACH repetition level. This means that 4 different values may be reported compared to 64 values with legacy LTE, see Table 2. In comparison to legacy LTE, only lower-order modulation scheme is supported for NB-IOT. For LTE higher order modulation schemes such as QPSK, 16QAM, 64QAM while only QPSK/BPSK is used in NB-IOT.

It is clear that the existing resolution cannot be maintained since only four values may be reported. The question is then what resolution to use for NB-IOT. In our view, the coverage area plays a key role here. A UE in normal coverage may experience decent channel quality similar to legacy LTE while a UE in enhanced coverage may have much poorer channel quality. From a power headroom reporting perspective, the UE may operate using the maximum power in enhanced coverage compared to normal coverage. Thus, it is relevant to have a finer reporting resolution in the lower reporting range (e.g., negative values). In normal coverage, on the other hand, it is more relevant to have finer reporting resolution in the higher reporting range (e.g., positive values) since the UE is in good coverage and it may not always use the maximum power, or the highest repetitions or more resources. Therefore, one set of reporting resolutions for normal coverage operation and another set of reporting ranges for enhanced coverage are specified.

Furthermore, it is relevant to differentiate the power headroom reporting in normal and enhanced coverages. In normal coverage, the UE may operate under quite good channel conditions, which means that it may not always use the maximum resources. Thus, it is relevant to have finer reporting granularity in the higher ranges of NB-PHR. On the other hand, the UE in enhanced coverage has to support operation down to −15 dB SNR, which requires operation using higher repetitions and more resources. It is highly likely that such UE operates using the maximum power. Therefore, it is more relevant to have higher granularity in the lower ranges of NB-PHR.

In one embodiment, the power headroom reporting of NB-IOT UE in normal coverage is specified as in Table 3 above with higher resolution on the positive range.

In another embodiment, the power headroom reporting of NB-IOT UE in enhanced coverage is specified as in Table 4 above with higher resolution in the negative range.

In another embodiment, the power headroom provides the serving eNB with information about the differences between the UE configured maximum output power ($P_{CMAX}$) and the estimated power for UL-NSCH transmission of the serving cell. Further, the reported power headroom may be estimated over one subframe. Also, the power headroom reporting delay is defined as the time between the beginning of the power headroom reference period and the time when the UE starts transmitting the power headroom over the radio interface. The reporting delay of the power headroom may be zero milliseconds (0 msec.), which is applicable for all configured triggering mechanisms for power headroom reporting. The report mapping for UE Category NB1 in normal coverage has a power headroom reporting range from −23 dB . . . +28 dB. Further, Table 5 below defines the report mapping.

TABLE 5

Power headroom report mapping for UE category NB1 in normal coverage

| Reported value | Measured quantity value (dB) |
|---|---|
| POWER_HEADROOM_0 | −23 ≤ PH < 4 |
| POWER_HEADROOM_1 | 4 ≤ PH < 16 |
| POWER_HEADROOM_2 | 16 ≤ PH < 28 |
| POWER_HEADROOM_3 | PH ≥ 28 |

In another embodiment, report mapping for UE Category NB1 in enhanced coverage has a power headroom reporting range from −23 dB . . . +13 dB. Further, Table 6 below defines the report mapping.

TABLE 6

Power headroom report mapping for UE category NB1 in enhanced coverage

| Reported value | Measured quantity value (dB) |
|---|---|
| POWER_HEADROOM_0 | −23 ≤ PH < −11 |
| POWER_HEADROOM_1 | −11 ≤ PH < 1 |
| POWER_HEADROOM_2 | 1 ≤ PH < 13 |
| POWER_HEADROOM_3 | PH ≥ 13 |

ABBREVIATIONS

Abbreviation Explanation

3GPP 3rd Generation Partnership Project
ACK Acknowledged
ADC Analog-to-Digital Conversion
AGC Automatic Gain Control
ANR Automatic Neighbor Relations
AP Access Point
BCH Broadcast Channel
BLER Block Error Rate
BS Base Station
BSC Base Station Controller
BTS Base Transceiver Station
CA Carrier Aggregation
CC Component Carrier
CG Cell Group
CGI Cell Global Identifier
CP Cyclic Prefix
CPICH Common Pilot Channel
CRC Cyclic Redundancy Check
CRS Cell specific Reference Signal
CSG Closed Subscriber Group
CSI Channel State Information
CSS Common Search Space
DAS Distributed Antenna System
DC Dual Connectivity
DFT Discrete Fourier Transform
DL Downlink
DL-SCH Downlink Shared Channel
DRX Discontinuous Reception
eNB Evolved Node B (i.e., base station)
E-UTRA Evolved Universal Terrestrial Radio Access
E-UTRAN Evolved Universal Terrestrial Radio Access Network DFT Discrete Fourier Transform
FDD Frequency Division Duplex
FFT Fast Fourier Transform
HD-FDD Half Duplex-Frequency Division Duplex
HO Handover
IFFT Inverse Fast Fourier Transform
IoT Internet of Things
LTE Long Term Evolution
M2M Machine to Machine
MAC Media Access Control
MCG Master Cell Group
MDT Minimization of Drive Tests
MeNB Master eNode B
MIB Master Information Block
MIMO Multiple Input Multiple Output
MME Mobility Management Entity
MRTD Maximum Receive Timing Difference
MSR Multi-Standard Radio
MTC Machine-Type Communication
NACK Not Acknowledged
NB Narrow-Band
NB-IoT Narrow-Band Internet of Things
NB-LTE Narrow-Band LTE (e.g., 180 KHz bandwidth)
NB-PBCH NB-IoT Physical Broadcast Channel
NB-PSS NB-IoT Primary Synchronization Sequence
NB-SSS NB-IoT Secondary Synchronization Sequence
OFDM Orthogonal Frequency Division Modulation
OFDMA Orthogonal Frequency Division Modulation Access
PA Power Amplifier
PAPR Peak-to-Average Power Ratio
PBCH Physical Broadcast Channel
PCI Physical Cell Identifier
PCC Primary Component Carrier
PCI Physical Cell Identity
PCell Primary Cell
PCG Primary Cell Group
PCH Paging Channel
PDCCH Physical Data Control Channel
PDU Protocol Data Unit
PGW Packet Gateway
PHICH Physical HARQ Indication Channel
PLMN Public Land Mobile Network
PRACH Physical Random Access Channel
PRB Physical Resource Block
PSCell Primary SCell
PSC Primary Serving Cell
PSD Power Spectral Density
PSS Primary Synchronization Sequence
PUSCH Physical Uplink Shared Channel
RACH Random Access Channel
RAT Radio Access Technology
RF Radio Frequency
RLM Radio Link Monitoring
RRC Radio Resource Control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SC-FDMA Single-Carrier, Frequency Division Multiple Access
SeNB Secondary eNode B
SFBC Space Frequency Block Coding
SFN System frame number
SGW Signaling gateway
SI System Information
SIB System Information Block
SIB1 System information block type 1
SIM Subscriber Identity Module or Subscriber Identification Module
SINR Signal to interference and noise ratio
SNR Signal to Noise Ratio
SON Self-organizing networks
SRS Sounding Reference Signal
SSC Secondary serving cell
SSS Secondary Synchronization Sequence
TA Timing advance
TAG Timing advance group
TDD Time Division Duplex
Tx Transmitter
UARFCN UMTS Absolute Radio Frequency Channel Number
UE User Equipment
UL Uplink
USS UE-specific Search Space
WB-LTE Wideband LTE (i.e., corresponds to legacy LTE)
ZC Zadoff-Chu algorithm The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions may be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a wireless device in a wireless communication system, the method comprising:
   obtaining information indicating a coverage level of the wireless device;
   determining, from amongst different power headroom report mappings respectively associated with different coverage levels of the wireless device, the power headroom report mapping associated with the coverage level indicated by the obtained information, wherein:
      each power headroom report mapping associates a set of reported values of power headroom to corresponding ranges of measured values of power headroom;
      the power headroom report mappings differ from each other with respect to reporting ranges and reporting resolution of power headroom information;
      at least two power headroom report mappings for different coverage levels include overlapping reporting ranges;
      at least one reported value of power headroom is associated with different ranges of measured values of power headroom in different power headroom mappings; and
   reporting the power headroom information using the determined power headroom report mapping.

2. The method of claim 1, wherein the reporting includes:
   generating an indication of the power headroom information using the determined reporting configuration; and
   transmitting, to a network node in the wireless communication system, the indication of the power headroom information.

3. The method of claim 1, further comprising transmitting, to a network node in the wireless communication system, an indication of the coverage level of the wireless device.

4. The method of claim 1, wherein the obtaining includes determining the coverage level of the wireless device based on the information.

5. The method of claim 1, further comprising receiving, from a network node in the wireless communication system, the information indicating the coverage level of the wireless device.

6. The method of claim 1:
   wherein the obtaining includes performing a measurement of a signal transmitted or received by the wireless device; and
   wherein the information includes the signal measurement.

7. The method of claim 1:
   wherein the obtaining includes determining a number of repetitions used for random access transmissions by the wireless device based on a random access configuration of the wireless device; and
   wherein the information includes the number of repetitions used for the random access transmissions.

8. The method of claim 1, wherein the determining the reporting configuration includes receiving, from a network node in the wireless communication system, an indication of the different power headroom report mappings.

9. The method of claim 1, wherein the information includes an indication that a network node serving the wireless device is using or supports the coverage level.

10. The method of claim 1, wherein the information includes an indication that a network node serving the wireless device supports the different coverage levels.

11. The method of claim 1, wherein the information includes a measurement of a signal transmitted or received by the wireless device.

12. The method of claim 1, wherein the information includes a random access configuration associated with the wireless device performing random access transmissions to a network node.

13. The method of claim 1, wherein the information includes a capability of the wireless device to support the different coverage levels.

14. The method of claim 1, wherein the information includes an indication of the different coverage levels of the wireless device.

15. The method of claim 1, wherein the determining the power headroom report mapping is based on predefined time periods associated with a measurement of a signal received by the wireless device from a network node.

16. The method of claim 1, wherein the determining the power headroom report mapping is based on one or more resources associated with the different power headroom report mappings being available for use by the wireless device.

17. The method of claim 1, wherein the determining the power headroom report mapping is based on data provided by a network node to assist the wireless device in the determining the power headroom report mapping.

18. The method of claim 1, wherein the different coverage levels include one or more normal coverage levels and one or more enhanced coverage levels.

19. The method of claim 1, wherein:
   the wireless device is capable of operating as a Long Term Evolution (LTE) Category Narrowband 1 (LTE Cat NB1) device; and
   the determined power headroom report mapping includes a power headroom report mapping for the LTE Cat NB1 device.

20. A wireless device in a wireless communication system, the wireless device comprising
   processing circuitry;
   memory containing instructions executable by the processing circuitry whereby the wireless device is operative to:
      obtain information indicating a coverage level of the wireless device;
      determine, from amongst different power headroom report mappings respectively associated with different coverage levels of the wireless device, the power headroom report mapping associated with the coverage level indicated by the obtained information, wherein:
         each power headroom report mapping associates a set of reported values of power headroom to corresponding ranges of measured values of power headroom;
         the power headroom report mappings differ from each other with respect to reporting ranges and reporting resolution of power headroom information;
         at least two power headroom report mappings for different coverage levels include overlapping ranges of measured values of power headroom;
         a same reported value of power headroom in different power headroom report mappings is associated with different ranges of measured values of power headroom; and
      report power headroom information using the determined power headroom report mapping.

* * * * *

UNITED STATES PATENT AND TRADEMARK OFFICE
CERTIFICATE OF CORRECTION

PATENT NO. : 11,564,179 B2
APPLICATION NO. : 16/312262
DATED : January 24, 2023
INVENTOR(S) : Thangarasa et al.

It is certified that error appears in the above-identified patent and that said Letters Patent is hereby corrected as shown below:

In the Specification

In Column 1, Lines 41-42, delete "physical shared data channel (PDSCH)." and insert -- physical downlink shared channel (PDSCH). --, therefor.

In Column 2, Line 21, delete "cell global identifier (CGI)" and insert -- cell global Identity (CGI) --, therefor.

In Column 2, Lines 28-29, delete "precoding matrix index (PMI)," and insert -- precoding matrix indicator (PMI), --, therefor.

In Column 2, Lines 50-51, delete "RRC connected" and insert -- RRC_CONNECTED --, therefor.

In Column 15, Line 41, delete "115a-b" and insert -- 115a-d --, therefor.

In Column 15, Line 44, delete "115a-b" and insert -- 115a-d --, therefor.

In Column 15, Line 47, delete "115a-b." and insert -- 115a-d. --, therefor.

In Column 15, Line 49, delete "115a-b" and insert -- 115a-d --, therefor.

In Column 15, Line 55, delete "115a-b." and insert -- 115a-d. --, therefor.

In Column 15, Line 57, delete "115a-b" and insert -- 115a-d --, therefor.

In Column 18, Line 12, delete "configuration" and insert -- configuration. --, therefor.

In Column 19, Line 52, delete "power source 1033," and insert -- power source 1013, --, therefor.

In Column 21, Lines 23-24, delete "data file 1027." and insert -- data 1027. --, therefor.

Signed and Sealed this
Sixth Day of June, 2023

Katherine Kelly Vidal
*Director of the United States Patent and Trademark Office*

In Column 21, Line 37, delete "WiMax," and insert -- WiMAX, --, therefor.

In Column 21, Line 44, delete "WiMax," and insert -- WiMAX, --, therefor.

In Column 22, Lines 9-10, delete "high-density digital versatile disc (HD-DVD)" and insert -- high definition digital versatile disc (HD-DVD) --, therefor.

In Column 22, Lines 17-18, delete "user identity (SIM/RUIM) module," and insert -- user identity module (SIM/RUIM), --, therefor.

In Column 22, Line 49-50, delete "coverage enhancement level (CE)" and insert -- coverage enhancement (CE) level --, therefor.

In Column 23, Line 20-21, delete "first node (node1) and the second node (node2)" and insert -- first node (Node1) and the second node (Node2) --, therefor.

In Column 24, Lines 22-23, delete "laptop embedded equipped (LEE)" and insert -- laptop embedded equipment (LEE) --, therefor.

In Column 24, Line 27, delete "narrow band" and insert -- narrowband --, therefor.

In Column 25, Line 4, delete "Wi Fi," and insert -- Wi-Fi, --, therefor.

In Column 25, Line 44, delete "RRC CONNECTED" and insert -- RRC_CONNECTED --, therefor.

In Column 26, Line 17, delete "signal-to-interference and noise ratio (SINR)," and insert -- signal-to-interference-plus-noise ratio (SINR), --, therefor.

In Column 26, Line 19, delete "common reference signal" and insert -- cell-specific reference signal --, therefor.

In Column 26, Line 27, delete "NRACH)" and insert -- NRACH). --, therefor.

In Column 28, Line 34, delete "cent" and insert -- cell1, --, therefor.

In Column 28, Line 51, delete "L %" and insert -- L% --, therefor.

In Column 30, Line 12, delete "$P_{CMAX,C}$)." and insert -- $P_{CMAX,C}(i)$). --, therefor.

In Column 34, Line 34, delete "UE," and insert -- UE. --, therefor.

In Column 34, Lines 45-58, delete "3GPP RAN1 . . . . NB-PHR." and insert the same at Line 46, as a new paragraph.

In Column 35, Line 7, delete "$P_{CMAX,C}$)." and insert -- $P_{CMAX,C}(i)$). --, therefor.

CERTIFICATE OF CORRECTION (continued)
U.S. Pat. No. 11,564,179 B2

In Column 36, Line 37, delete "ACK Acknowledged" and insert -- ACK Acknowledgment --, therefor.

In Column 37, Line 20, delete "NACK Not Acknowledged" and insert -- NACK Negative Acknowledgment --, therefor.

In Column 37, Line 21, delete "NB Narrow-Band" and insert -- NB Narrowband --, therefor.

In Column 37, Line 22, delete "NB-IoT Narrow-Band Internet of Things" and insert -- NB-IoT Narrowband Internet of Things --, therefor.

In Column 37, Line 23, delete "NB-LTE Narrow-Band LTE" and insert -- NB-LTE Narrowband LTE --, therefor.

In Column 37, Line 25, delete "NB-PSS NB-IoT Primary Synchronization Sequence" and insert -- NB-PSS NB-IoT Primary Synchronization Signal --, therefor.

In Column 37, Line 26, delete "NB-SSS NB-IoT Secondary Synchronization Sequence" and insert -- NB-SSS NB-IoT Secondary Synchronization Signal --, therefor.

In Column 37, Line 27, delete "OFDM Orthogonal Frequency Division Modulation" and insert -- OFDM Orthogonal Frequency Division Multiplexing --, therefor.

In Column 37, Lines 28-29, delete "OFDMA Orthogonal Frequency Division Modulation Access" and insert -- OFDMA Orthogonal Frequency Division Multiple Access --, therefor.

In Column 37, Line 35, delete "PCI Physical Cell Identity".

In Column 37, Line 39, delete "PDCCH Physical Data Control Channel" and insert -- PDCCH Physical Downlink Control Channel --, therefor.

In Column 37, Line 42, delete "PHICH Physical HARQ Indication Channel" and insert -- PHICH Physical HARQ Indicator Channel --, therefor.

In Column 37, Line 49, delete "PSS Primary Synchronization Sequence" and insert -- PSS Primary Synchronization Signal --, therefor.

In Column 38, Line 12, delete "SINR Signal to interference and noise ratio" and insert -- SINR signal-to-interference-plus-noise ratio --, therefor.

In Column 38, Line 17, delete "SSS Secondary Synchronization Sequence" and insert -- SSS Secondary Synchronization Signal --, therefor.

In the Claims

In Column 41, Line 22, in Claim 20, delete "comprising" and insert -- comprising: --, therefor.